US012694699B2

(12) United States Patent　　(10) Patent No.:　US 12,694,699 B2

Matias et al.　　(45) Date of Patent:　Jul. 28, 2026

(54) ENHANCING DEEPFAKE DETECTION USING FORENSIC MODELS

(71) Applicant: Claritas Software Solutions Ltd, Tel-Aviv (IL)

(72) Inventors: Michael Matias, Tel Aviv (IL); Gil Avriel, Mevaseret Zion (IL); Natalie Fridman, Petach Tikva (IL); Shmuel Ur, Doar-Na Misgav (IL)

(73) Assignee: Claritas Software Solutions Ltd, Tel-Aviv (IL)

( * ) Notice: Subject to any disclaimer, the term of this patent is extended or adjusted under 35 U.S.C. 154(b) by 204 days.

(21) Appl. No.: 18/409,871

(22) Filed: Jan. 11, 2024

(65) Prior Publication Data

US 2025/0148785 A1　　May 8, 2025

Related U.S. Application Data

(60) Provisional application No. 63/596,326, filed on Nov. 6, 2023, provisional application No. 63/449,182, filed on Mar. 1, 2023.

(51) Int. Cl.
*G06K 9/00*　　(2022.01)
*G06V 10/44*　　(2022.01)
*G06V 10/70*　　(2022.01)
*G06V 10/764*　　(2022.01)
*G06V 10/771*　　(2022.01)
(Continued)

(52) U.S. Cl.
CPC .............. *G06V 20/95* (2022.01); *G06V 10/44* (2022.01); *G06V 10/764* (2022.01); *G06V 10/768* (2022.01); *G06V 10/771* (2022.01);

*G06V 10/774* (2022.01); *G06V 10/776* (2022.01); *G06V 20/40* (2022.01); *G06V 20/41* (2022.01);
(Continued)

(58) Field of Classification Search
CPC ............................. G06V 10/44; G06V 10/764
See application file for complete search history.

(56) References Cited

U.S. PATENT DOCUMENTS

| | | |
|---|---|---|
| 2020/0097643 A1 | 3/2020 | Uzun et al. |
| 2021/0049366 A1 | 2/2021 | Horton et al. |
| 2021/0074305 A1 | 3/2021 | Gopala et al. |
| 2021/0209606 A1 | 7/2021 | Herlands |
| 2021/0273811 A1 | 9/2021 | Burke |
| 2022/0121868 A1 | 4/2022 | Chen et al. |

(Continued)

OTHER PUBLICATIONS

Akbari et al. "Digital Forensic Analysis for Source Video Identification: A Survey", Forensic Science International: Digital Investigation, 41: 301390-1-301390-17, Jun. 1, 2022.
(Continued)

*Primary Examiner* — Molly Wilburn
*Assistant Examiner* — Aidan Keup

(57) ABSTRACT

There is provided a computer implemented method of detecting a deepfake video, comprising: feeding a video into at least one forensic model, obtaining at least one indication of at least one property of a person or object depicted in the video as an outcome of the at least one forensic model, comparing the at least one indication to at least one ground truth obtained by applying the at least one forensic model to at least one authentic video depicting the person or object and/or by searching a ground truth dataset, in response to a mismatch between the at least one indication and the at least one ground truth, increasing likelihood that the video is deepfake, and in response to a match between the at least one indication and the at least one ground truth, increasing likelihood that the video is authentic.

17 Claims, 11 Drawing Sheets

(51) Int. Cl.

| | | |
|---|---|---|
| *G06V 10/774* | (2022.01) | |
| *G06V 10/776* | (2022.01) | |
| *G06V 20/00* | (2022.01) | |
| *G06V 20/40* | (2022.01) | |
| *G06V 20/70* | (2022.01) | |
| *G06V 40/10* | (2022.01) | |
| *G06V 40/40* | (2022.01) | |
| *G10L 15/16* | (2006.01) | |

(52) U.S. Cl.
CPC .............. *G06V 20/70* (2022.01); *G06V 40/10* (2022.01); *G06V 40/40* (2022.01); *G10L 15/16* (2013.01)

(56) References Cited

U.S. PATENT DOCUMENTS

| | | |
|---|---|---|
| 2022/0138472 A1 | 5/2022 | Mittal et al. |
| 2022/0261580 A1 | 8/2022 | Soryal |
| 2022/0374105 A1 | 11/2022 | Seth et al. |
| 2025/0005925 A1* | 1/2025 | Bera .................... G06V 40/161 |
| 2025/0182510 A1 | 6/2025 | Malik et al. |

OTHER PUBLICATIONS

Guo et al. "A Survey on Automated Fact-Checking", Transactions of the Association for Computational Linguistics, 10: 178-206, Feb. 9, 2022.

Kunhoth et al. "Video Steganography: Recent Advances and Challenges", Multimedia Tools and Applications, 82: 41943-41985, Published Online Apr. 4, 2023.

Moufidi et al. "Attention-Based Fusion of Ultrashort Voice Utterances and Depth Videos for Multimodal Person Identification", Sensors, 23(13): 5890-1-5890-13, Jun. 25, 2023.

International Search Report and the Written Opinion Dated Dec. 16, 2024 From the International Searching Authority Re. Application No. PCT/IL2024/050890. (14 Pages).

Official Action Dated Jul. 25, 2025 from the US Patent and Trademark Office Re. U.S. Appl. No. 18/409,866. (22 pages).

International Preliminary Report on Patentability Dated May 21, 2026 From the International Bureau of WIPO Re. Application No. PCT/IL2024/050890 (9 Pages).

Official Action Dated Jun. 1, 2026 from the US Patent and Trademark Office Re. U.S. Appl. No. 18/409,861. (12 pages).

Official Action Dated Jun. 2, 2026 from the US Patent and Trademark Office Re. U.S. Appl. No. 18/409,874. (163 pages).

Dar et al. "Efficient-SwishNet Based System for Facial Emotion Recognition", IEEE Access, 10: 71311-71328, Jul. 5, 2022.

Fan et al. "FamDroid: Learning-Based Android Malware Family Classification Using Static Analysis", ArXiv Preprint ArXiv: 2101.03965v2, p. 1-10, Jan. 29, 2021.

Nordquist "Coordinate Adjectives: Definition and Examples - Glossary of Grammatical and Rhetorical Terms", WayBack Machine, Retrieved on the Internet, p. 1-3, Apr. 1, 2018.

Tsao et al. "Mechanisms of Face Perception", Annual Review of Neuroscience, 31:411-437, Jul. 2008.

* cited by examiner

100

Identify class of a specific deepfake tool
302

Obtain a sample authentic video,
optionally selected according to the class
304

Feed the sample authentic video into a
specific deepfake tool 306

Obtain a deepfake video from the specific
deepfake model 308

Iterate
for
creating a
training
dataset
of
multiple
records
312

Create record 310

Train detection ML model 314

ENHANCING DEEPFAKE DETECTION USING FORENSIC MODELS

RELATED APPLICATIONS

This application claims the benefit of priority of U.S. Provisional Patent Application No. 63/596,326 filed on Nov. 6, 2023, the contents of which are incorporated herein by reference in their entirety.

This application also claims the benefit of priority of U.S. Provisional Patent Application No. 63/449,182 filed on Mar. 1, 2023.

FIELD AND BACKGROUND OF THE INVENTION

The present invention, in some embodiments thereof, relates to machine learning models and, more specifically, but not exclusively, to machine learning models for detection of deepfake produced videos.

Deepfake is a technology used to create synthetic videos.

SUMMARY OF THE INVENTION

According to a first aspect, a computer implemented method of detecting a deepfake video, comprises: feeding a video into at least one forensic model, obtaining at least one indication of at least one property of a person or object depicted in the video as an outcome of the at least one forensic model, comparing the at least one indication to at least one ground truth obtained by applying the at least one forensic model to at least one authentic video depicting the person or object and/or by searching a ground truth dataset, in response to a mismatch between the at least one indication and the at least one ground truth, increasing likelihood that the video is deepfake, and in response to a match between the at least one indication and the at least one ground truth, increasing likelihood that the video is authentic.

In a further implementation form of the first aspect, the at least one forensic model is not trained to detect whether the video is a deepfake video.

In a further implementation form of the first aspect, the at least one ground truth for comparison is found by searching an index of the ground truth dataset of records according to the person or object to find a matching record that includes the ground truth.

In a further implementation form of the first aspect, the at least one ground truth comparison is found by searching to find the matching record without applying the at least one forensic model to the at least one authentic video to obtain the at least one ground truth.

In a further implementation form of the first aspect, further comprising creating the ground truth dataset by: searching for a plurality of authentic videos that include different people and/or objects, applying the forensic model to each authentic video to obtain a ground truth for each person and/or object, creating a record for each person and/or object that includes the ground truth corresponding to the person and/or object, and adding the record to the index according to the person and/or object corresponding to the ground truth of the record.

In a further implementation form of the first aspect, the at least one forensic model comprises at least one voice forensic model trained to analyze voice to determine at least one property of the speaker.

In a further implementation form of the first aspect, the at least one property is selected from: height, weight, office size, medical condition, native tongue, and tiredness.

In a further implementation form of the first aspect, the at least one property of the person or object comprises at least one physical property of the person or object.

In a further implementation form of the first aspect, a forensic model is assigned a classification according to predicted changes in outcome over time, and the at least one property outcome of the forensic model is evaluated according to the classification.

In a further implementation form of the first aspect, the classification and evaluation are selected from: (i) predicted to stay the same, and at least one property used as is, (ii) predicted to vary within a range, and verifying whether the at least one property falls within the range of the ground truth, and (iii) predicted to last a predefined amount of time, and not using the at least one property when the predefined amount of time has elapsed.

In a further implementation form of the first aspect, further comprising generating a report indicating at least one of: the match or mismatch, a value of the increase in likelihood that the video is deepfake or authentic, and in response to a mismatch providing the at least one indication outcome of the at least one forensic model and the at least one ground truth.

According to a second aspect, a system for detecting a deepfake video, comprises: at least one processor executing a code for: feeding a video into at least one forensic model, obtaining at least one indication of at least one property of a person or object depicted in the video as an outcome of the at least one forensic model, comparing the at least one indication to at least one ground truth obtained by applying the at least one forensic model to at least one authentic video depicting the person or object and/or by searching a ground truth dataset, in response to a mismatch between the at least one indication and the at least one ground truth, increasing likelihood that the video is deepfake, and in response to a match between the at least one indication and the at least one ground truth, increasing likelihood that the video is authentic.

In a further implementation form of the second aspect, the at least one forensic model is not trained to detect whether the video is a deepfake video.

In a further implementation form of the second aspect, the at least one ground truth for comparison is found by searching an index of the ground truth dataset of records according to the person or object to find a matching record that includes the ground truth, without applying the at least one forensic model to the at least one authentic video to obtain the at least one ground truth.

In a further implementation form of the second aspect, further comprising code for creating the ground truth dataset by: searching for a plurality of authentic videos that include different people and/or objects, applying the forensic model to each authentic video to obtain a ground truth for each person and/or object, creating a record for each person and/or object that includes the ground truth corresponding to the person and/or object, and adding the record to the index according to the person and/or object corresponding to the ground truth of the record.

In a further implementation form of the second aspect, the at least one forensic model comprises at least one voice forensic model trained to analyze voice to determine at least one property of the speaker.

In a further implementation form of the second aspect, the at least one property of the person or object comprises at least one physical property of the person or object.

In a further implementation form of the second aspect, a forensic model is assigned a classification according to predicted changes in outcome over time, and the at least one property outcome of the forensic model is evaluated according to the classification.

In a further implementation form of the second aspect, further comprising code for generating a report indicating at least one of: the match or mismatch, a value of the increase in likelihood that the video is deepfake or authentic, and in response to a mismatch providing the at least one indication outcome of the at least one forensic model and the at least one ground truth.

According to a third aspect, A non-transitory medium storing program instructions for detecting a deepfake video, which when executed by at least one processor, cause the at least one processor to: feed a video into at least one forensic model, obtain at least one indication of at least one property of a person or object depicted in the video as an outcome of the at least one forensic model, compare the at least one indication to at least one ground truth obtained by applying the at least one forensic model to at least one authentic video depicting the person or object and/or by searching a ground truth dataset, in response to a mismatch between the at least one indication and the at least one ground truth, increase likelihood that the video is deepfake, and in response to a match between the at least one indication and the at least one ground truth, increase likelihood that the video is authentic.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings.

DESCRIPTION OF SPECIFIC EMBODIMENTS OF THE INVENTION

Figure 1:
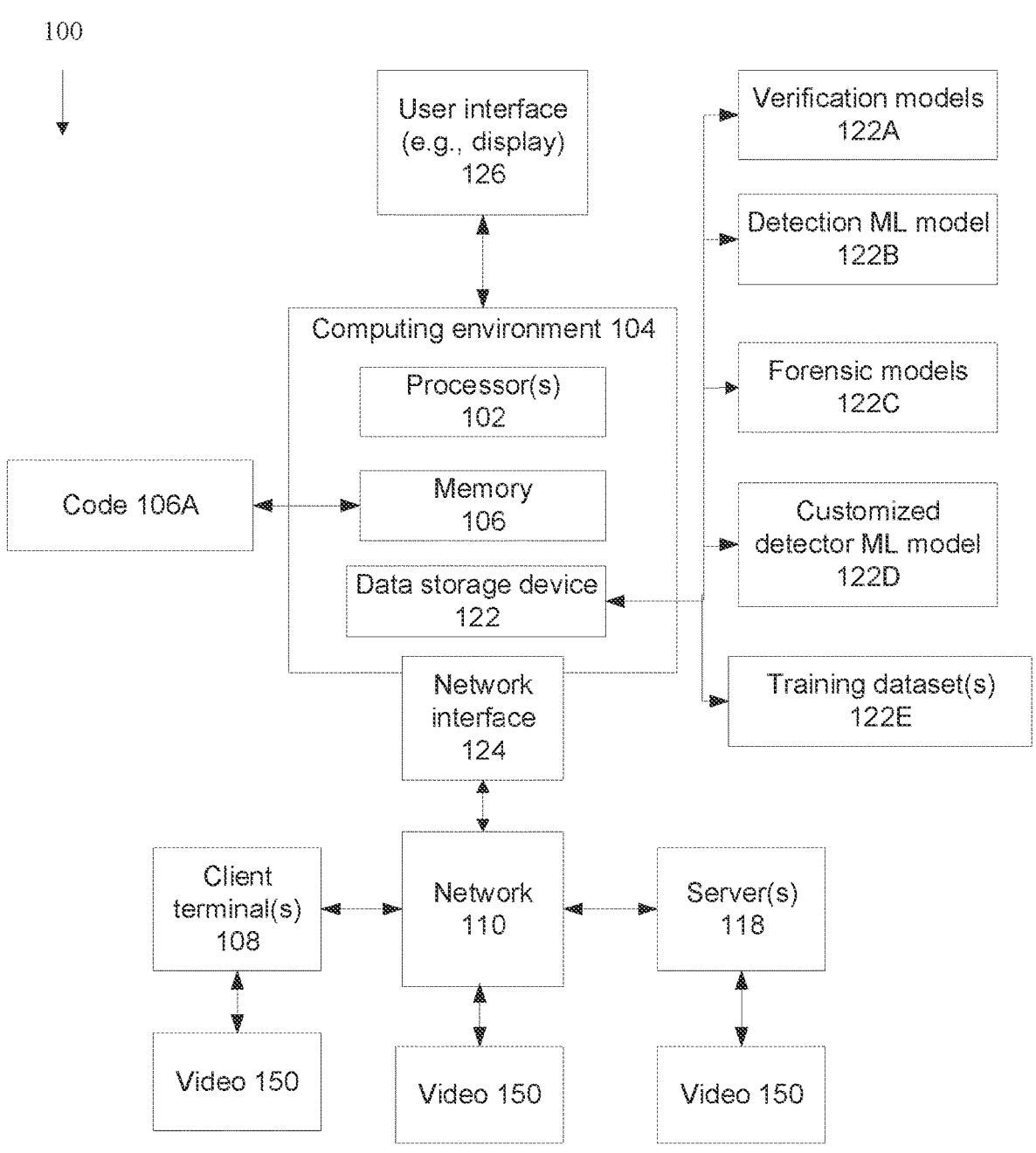
FIG. 1 is a schematic of components of a system for detecting a deepfake video and/or determining use of a specific deepfake tool, in accordance with some embodiments of the present invention.

The present invention, in some embodiments thereof, relates to machine learning models and, more specifically, but not exclusively, to machine learning models for detection of deepfake produced videos.

A deepfake video created by a deepfake tool may be an entirely synthetic video, and/or an authentic video may include one or more synthetic frames and/or one or more synthetic scenes. Alternatively or additionally the deepfake video may be an adaptation of an authentic video, in which one or more features are synthesized, for example, adapting a face, adapting what a person says, adapting a body of a person, replacing an object, adapting a background, and removing an object and the like.

An aspect of some embodiments of the present invention relates to systems, methods, computing devices, and/or code instructions, for detecting that an input video is a deepfake video created by a deepfake tool. An input video is analyzed, for example, harvesting data out of the video, determining a context in which the video was found, and obtaining technical information of the video. The input video is annotated according to the analysis. Examples of annotation include people in the video, language used in the video, location of the video, objects depicted in the video, topics discussed in the video, activity performed in the video, and actual spoken words in the video. Multiple verification models are selected according to the annotations. The verification models may be selected according to evaluation weights applied to the verification models. The evaluation weights may be computed according to the annotations. Optionally, one of the verification model is a forensic model that is not trained to detect that the video is a deepfake video. Outcome of the forensic model obtained by applying the forensic model to the input video may be compared to a ground truth obtained by applying the forensic model to one or more other authentic videos having corresponding annotation(s) of the input video and/or to a dataset (e.g., database) of ground truth values. Outcomes of the verification models are aggregated. Likelihood (e.g., probability) that the input video was created by a deepfake tool is determined according to the aggregation.

An aspect of some embodiments of the present invention relates to systems, methods, computing devices, and/or code instructions, for training a detection machine learning model (ML) for identifying a specific deepfake tool of multiple candidate deepfake tools used to create a deepfake video. Multiple sample authentic videos are fed into the specific deepfake tool. Multiple deepfake videos are obtained as an outcome of the specific deepfake tool. A training dataset of multiple records is created. One type of record of the training dataset includes a deepfake video labelled with a ground truth indicating the specific deepfake tool used to create the deepfake video. Optionally, another type of record of the training dataset includes authentic videos, which may include a ground truth indicating that no deepfake tool was used and/or that the video of the record is authentic. The detection ML model is trained on the training dataset, for detecting that the specific deepfake tool was used to create an input deepfake video.

Optionally, a class of the specific deepfake tool is identified according to adaptation(s) performed by the specific deepfake tool on an input video. Examples of classes include: adapting a face, adapting what a person says, adapting a body of a person, replacing an object, adapting a background, and removing an object. The sample authentic videos corresponding to the class may be selected, e.g. one that includes faces. The deepfake videos are modified by the specific deepfake tool based on the class.

An aspect of some embodiments of the present invention relates to systems, methods, computing devices, and/or code instructions, for detecting a deepfake video using forensic models. An input video is fed into one or more forensic models. An indication(s) of one or more properties of a person and/or object depicted in the video is obtained as an outcome of the forensic model(s). For example, height, weight, size, medical condition, native tongue, and tiredness (when available as ground truth). The indication(s) is compared to a ground truth(s) obtained by applying the forensic model(s) to an authentic video(s) depicting the same or similar person and/or object, and/or by searching a ground truth dataset storing previously generated ground truths which are known to be authentic. Likelihood that the video is deepfake is increased in response to a mismatch between the indication(s) and the ground truth(s). Alternatively, likelihood that the video is authentic, or at least the current part being analyze is authentic, is increased in response to a match between the indication(s) and the ground truth(s).

An aspect of some embodiments of the present invention relates to systems, methods, computing devices, and/or code instructions, for training a customized detector ML model for use on an input video. The input video is analyzed to identify features associated with the input video. Examples of features include people depicted in the input video, camera used to capture the input video, language spoken in the input video, and background depicted in the input video. Authentic videos associated with the features are obtained, and fed into one or more deepfake tools. Deepfake videos are obtained as an outcome of the deepfake tool. A training dataset of multiple records is created. At least one first type of record includes a deepfake video labelled with a ground truth indicating deepfake. At least one second type of record includes an authentic video labelled with a ground truth indicating authenticity. The customized detector ML model is trained on the training dataset for detecting whether the input video is a deepfake video.

At least some implementations of the systems, methods, computing devices, and/or code instructions (stored on a data storage device and executable by one or more processors) described herein address the technical problem of detecting deepfake generated videos. At least some implementations described herein improve the technology of machine learning models for detecting deepfake generated videos. At least some implementations described herein improve upon prior approaches of detecting deepfake generated video.

Deepfake is a technology used to create synthetic video, in most cases in order to change something about the video. The change may be, for example, a person to another person, what the person is saying, what is happening, etc. The video may also not be a manipulation of a real video and/or a synthetic creation of a video. Deepfake is an important technology, and poses a big threat to trust. People don't know anymore, that what they have seen was actually filmed and not syntactically created or manipulated. With the advent of technology creating a deepfake that can fool humans is getting much easier.

To try to combat the threat of deepfake, deepfake detectors are created. This kind of software receives a video and tries to determine if it was synthetically created, or part of it was syntactically created or modified. There is an "arms race" between deepfake and deepfake detectors, and therefore, better detection of deepfake videos is needed as deepfake technology improves.

At least some embodiments described herein address the aforementioned technical problem, and/or improve the aforementioned technical field, and/or improve over existing approaches for detecting whether a video is a deepfake video, by aggregating outcomes of multiple verification models. The verification models may be selected according to annotations of an input video. The verification models may be selected according to corresponding evaluation weights.

At least some embodiments described herein address the aforementioned technical problem, and/or improve the aforementioned technical field, and/or improve over existing approaches for detecting whether a video is a deepfake video, by training a detection ML model for identifying a specific deepfake tool out of multiple deepfake tools used to create an input video determined to be a deepfake video. The detection ML model is trained as described herein.

At least some embodiments described herein address the aforementioned technical problem, and/or improve the aforementioned technical field, and/or improve over existing approaches for detecting whether an input video is a deepfake video, by using forensic models, which are not trained for directly detecting whether the input video is a deepfake video. The forensic models are used to obtain one or more properties of a person and/or object depicted in the input video, for example, height, weight, medical condition, size, and the like. The properties of the person and/or object are compared to a ground truth of the same or similar person and/or object (e.g., determined to be authentic). The ground truth may be obtained, for example, by applying the same forensic models to authentic videos depicting the same or similar persona and/or object, and/or using other approaches. The ground truth may be included in a dataset (e.g., database). A match increases likelihood that the video is authentic. A mismatch increases likelihood that the video is deepfake.

At least some embodiments described herein address the aforementioned technical problem, and/or improve the aforementioned technical field, and/or improve over existing approaches for detecting whether an input video is a deepfake video, by training a customized detector ML model on records of a first type that include deepfake videos generated by a deepfake tool fed authentic videos with features corresponding to the input video, labeled with a ground truth indicating deepfake, and records of a second type that includes authentic videos with features corresponding to the input video, labeled with a ground truth indicating authenticity. The customized detector ML model may be dynamically trained for a specific input video, to improve accuracy of determining whether the specific input video is a deepfake video.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
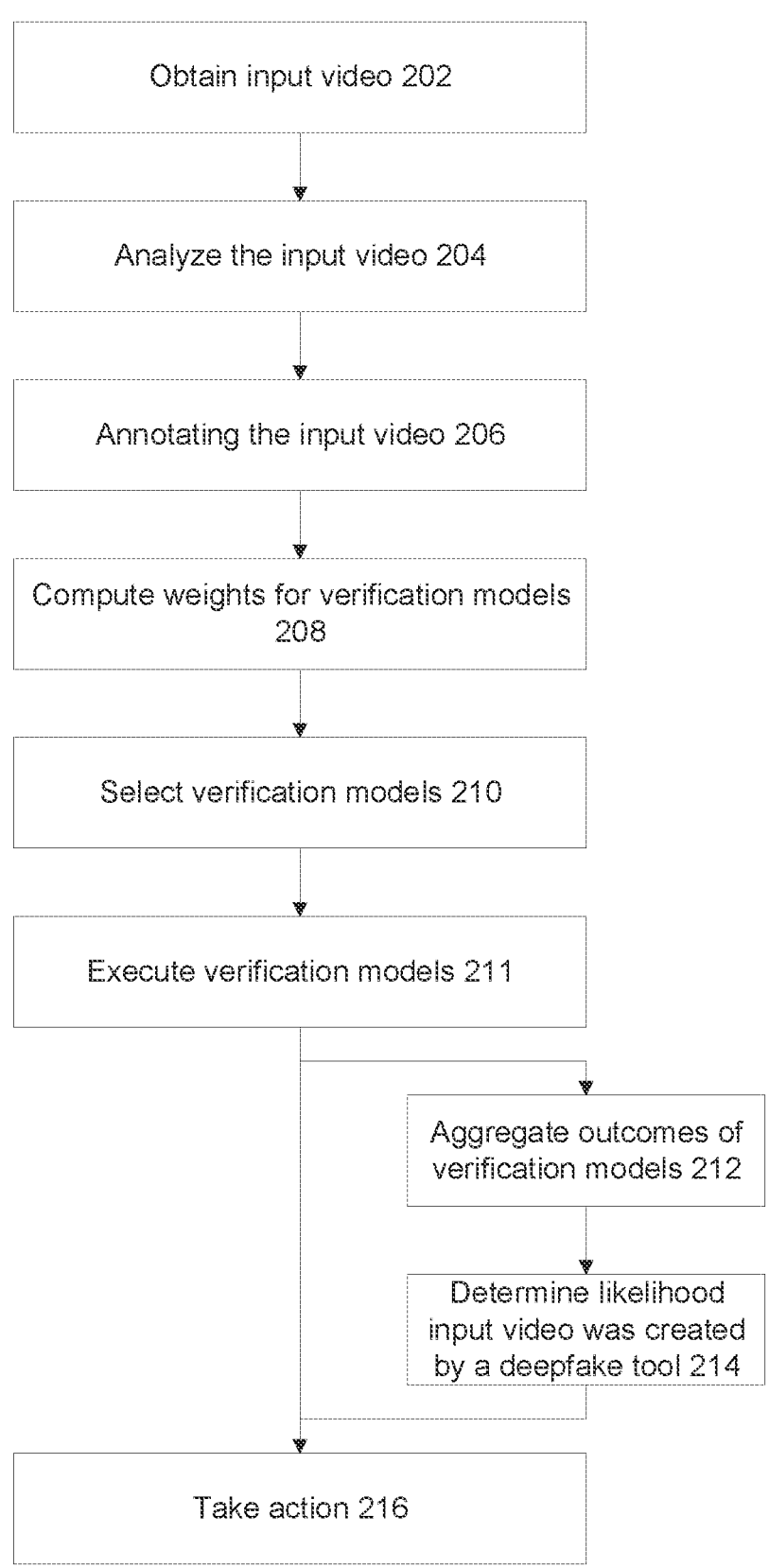
FIG. 2 is a flowchart of a method of determining likelihood that a video was created by a deepfake tool according to an aggregation of outcomes of verifications models selected according to annotations of the video, in accordance with some embodiments of the present invention.
Figure 3A:
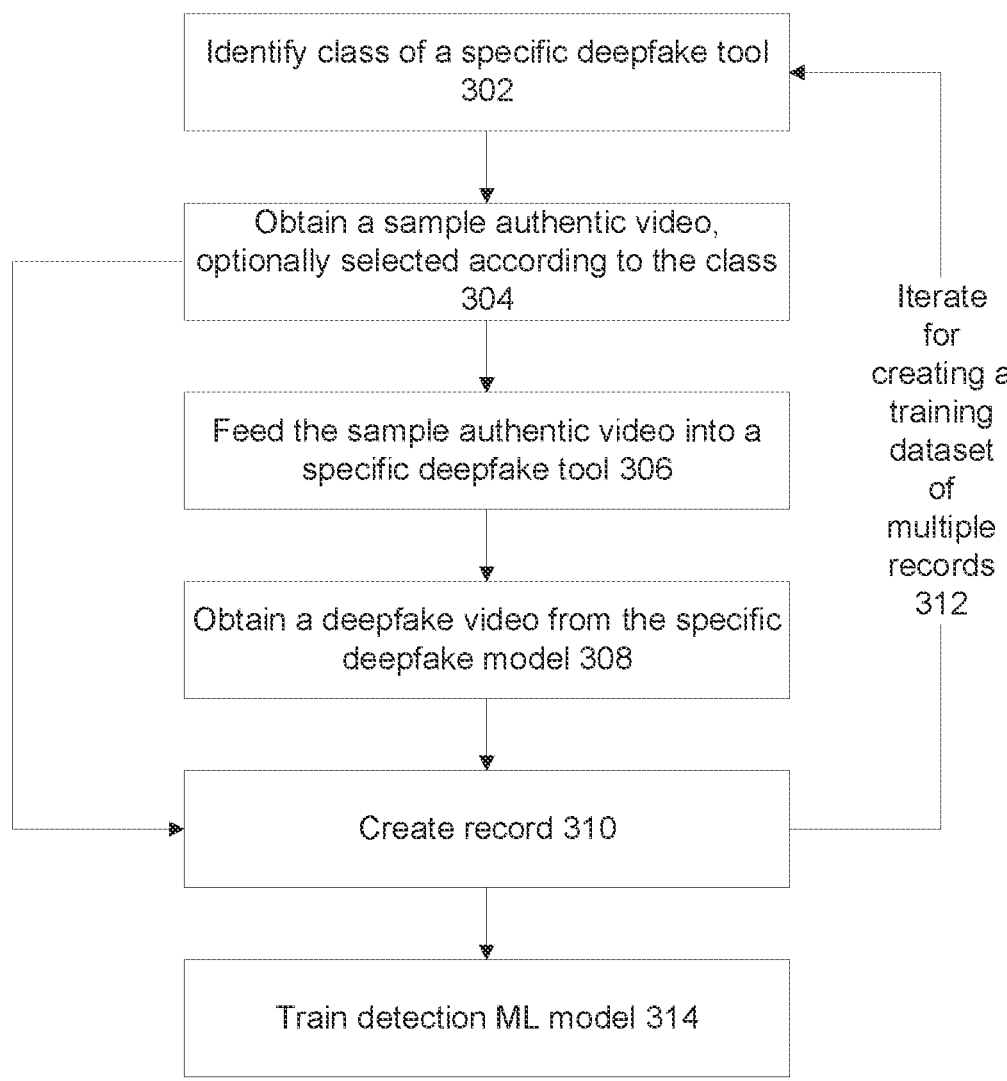
FIG. 3A is a flowchart of a method of training a detection ML model for determining whether a video was created by a specific deepfake tool, in accordance with some embodiments of the present invention.
Figure 3B:
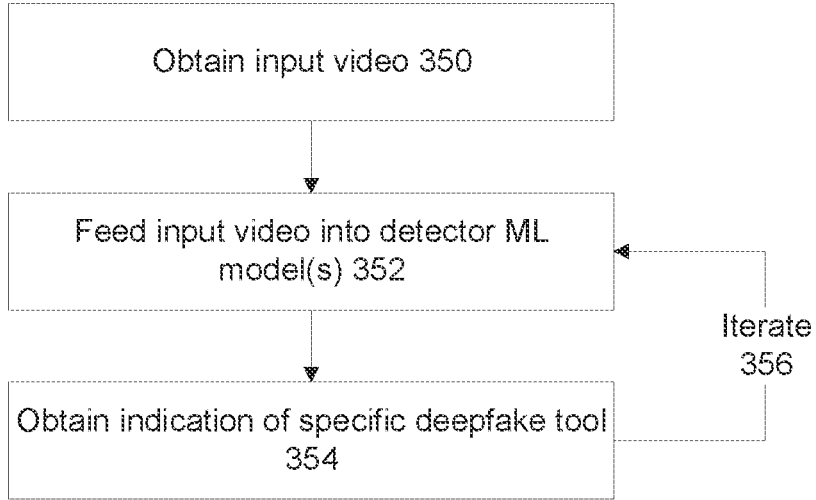
FIG. 3B is a flowchart of a method of inference by the detection ML model for determining whether a video was created by a specific deepfake tool, in accordance with some embodiments of the present invention.
Figure 4:
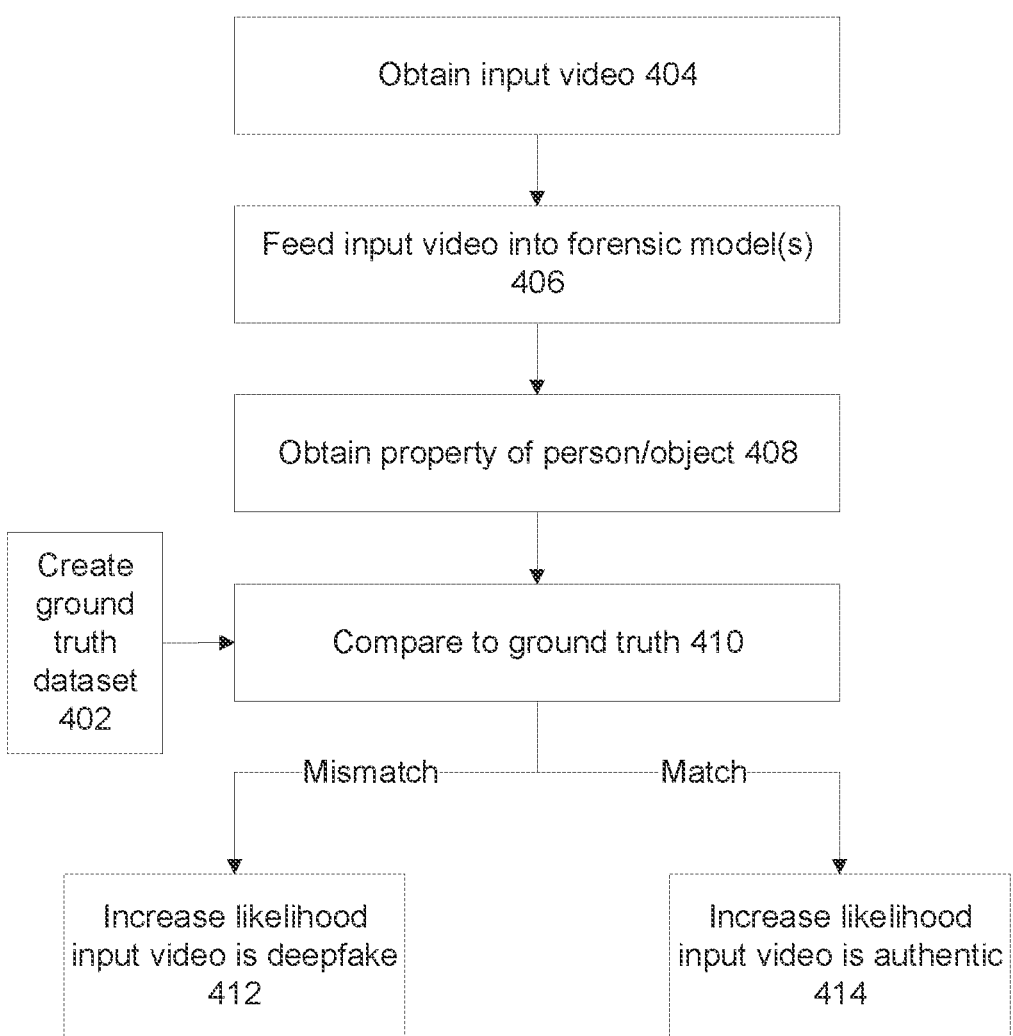
FIG. 4 is a flowchart of a method of determining whether a video was created by a deepfake tool by comparing output of a forensic model(s) to ground truth, in accordance with some embodiments of the present invention.
Figure 5:
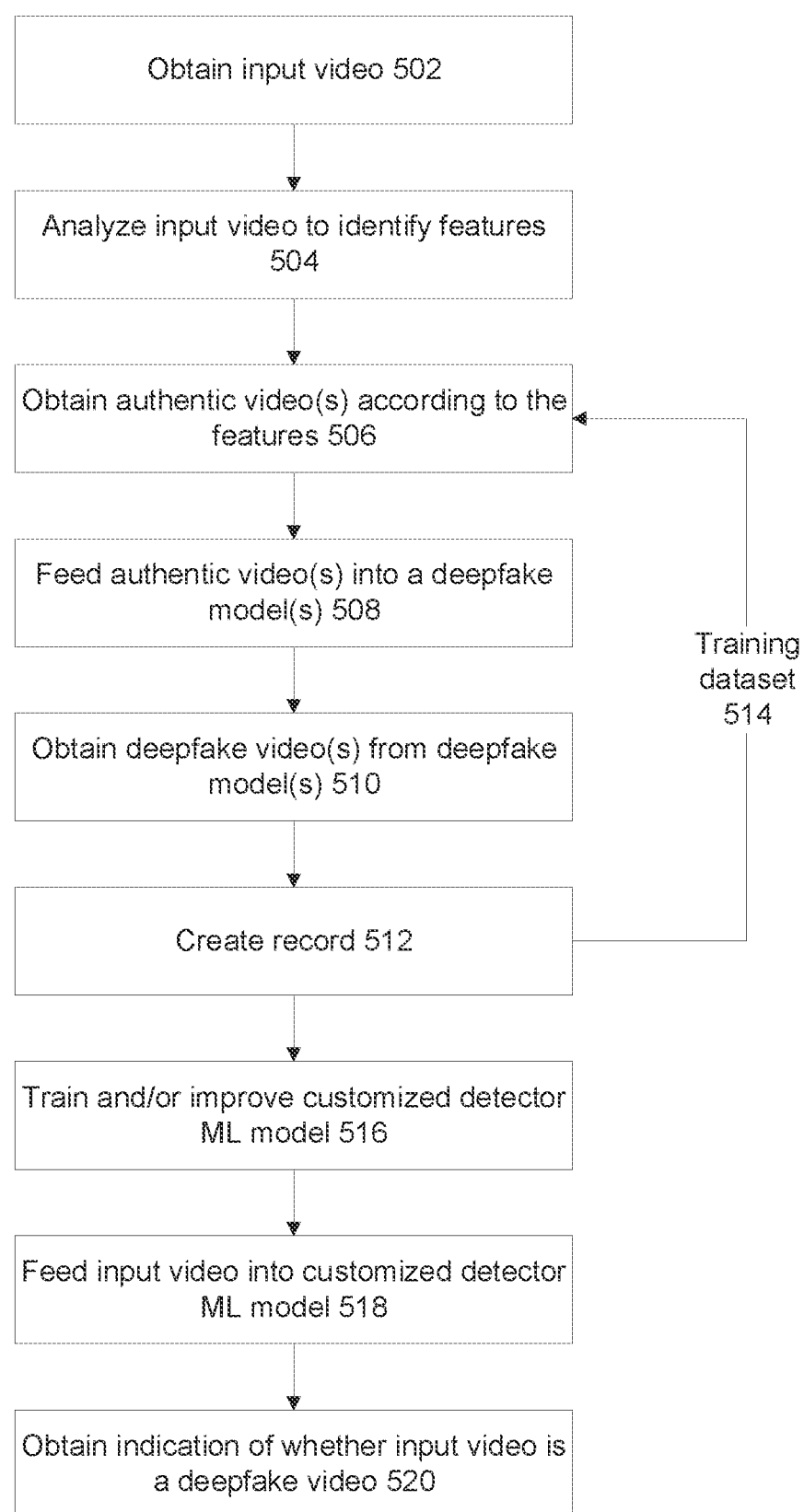
FIG. 5 is a flowchart of a method of training of and/or inference by a customized detector ML model, in accordance with some embodiments of the present invention.
Figure 6:
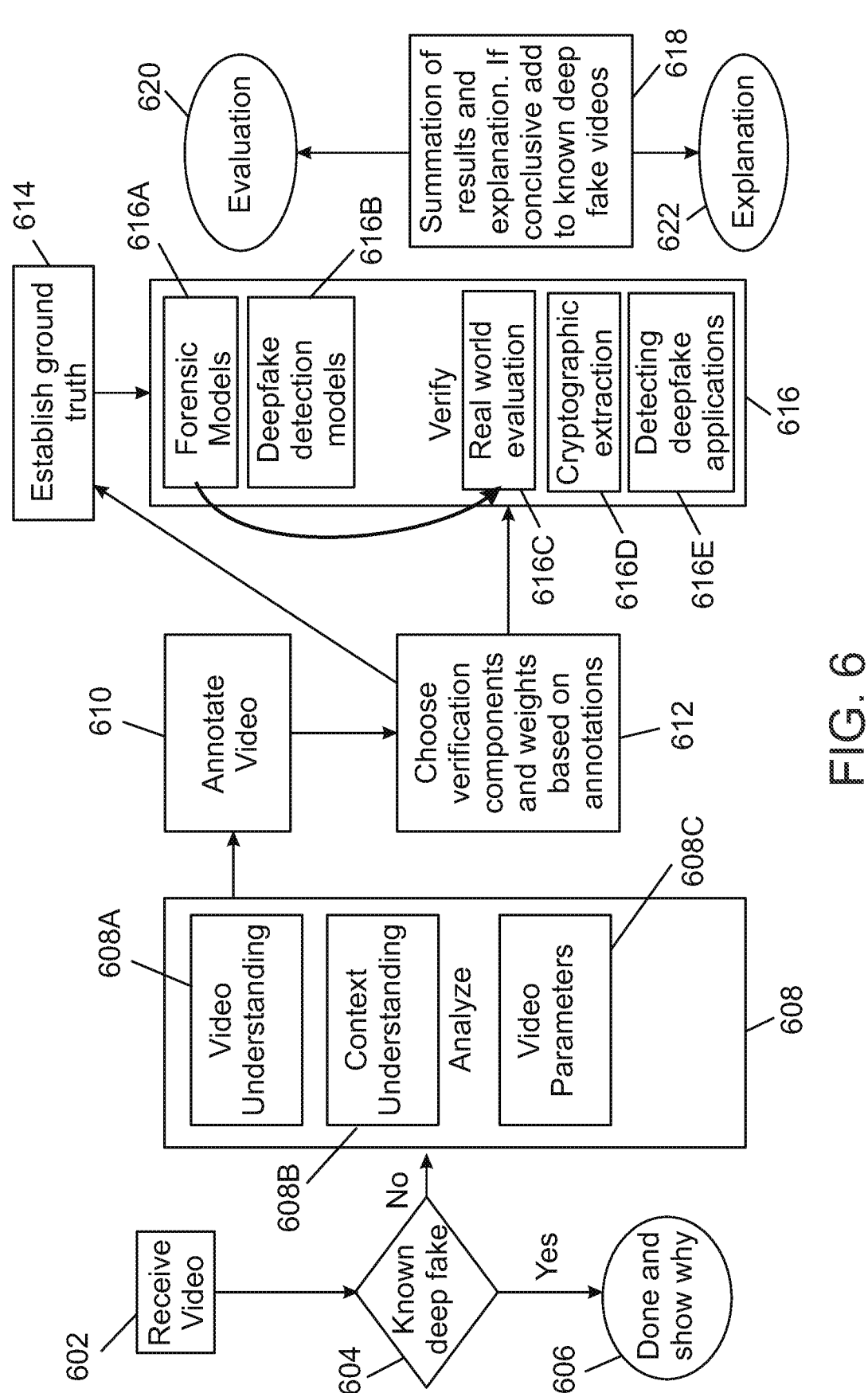
FIG. 6 is a flowchart of another method of detecting a deepfake video, in accordance with some embodiments of the present invention.
Figure 7:
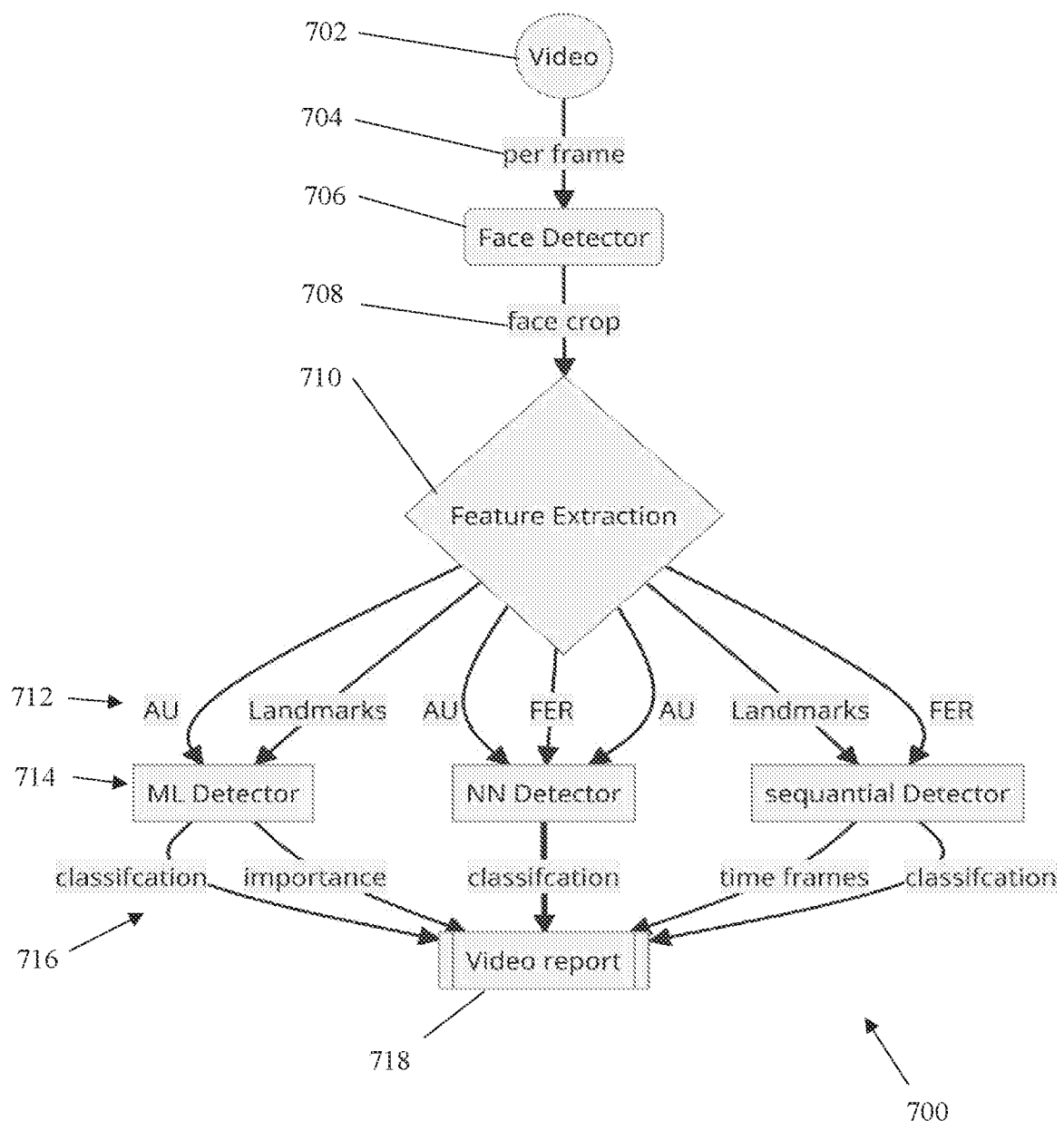
FIG. 7 is an exemplary dataflow diagram depicting aggregation outcomes of multiple different verification models, in accordance with some embodiments of the present invention.
Figure 8:
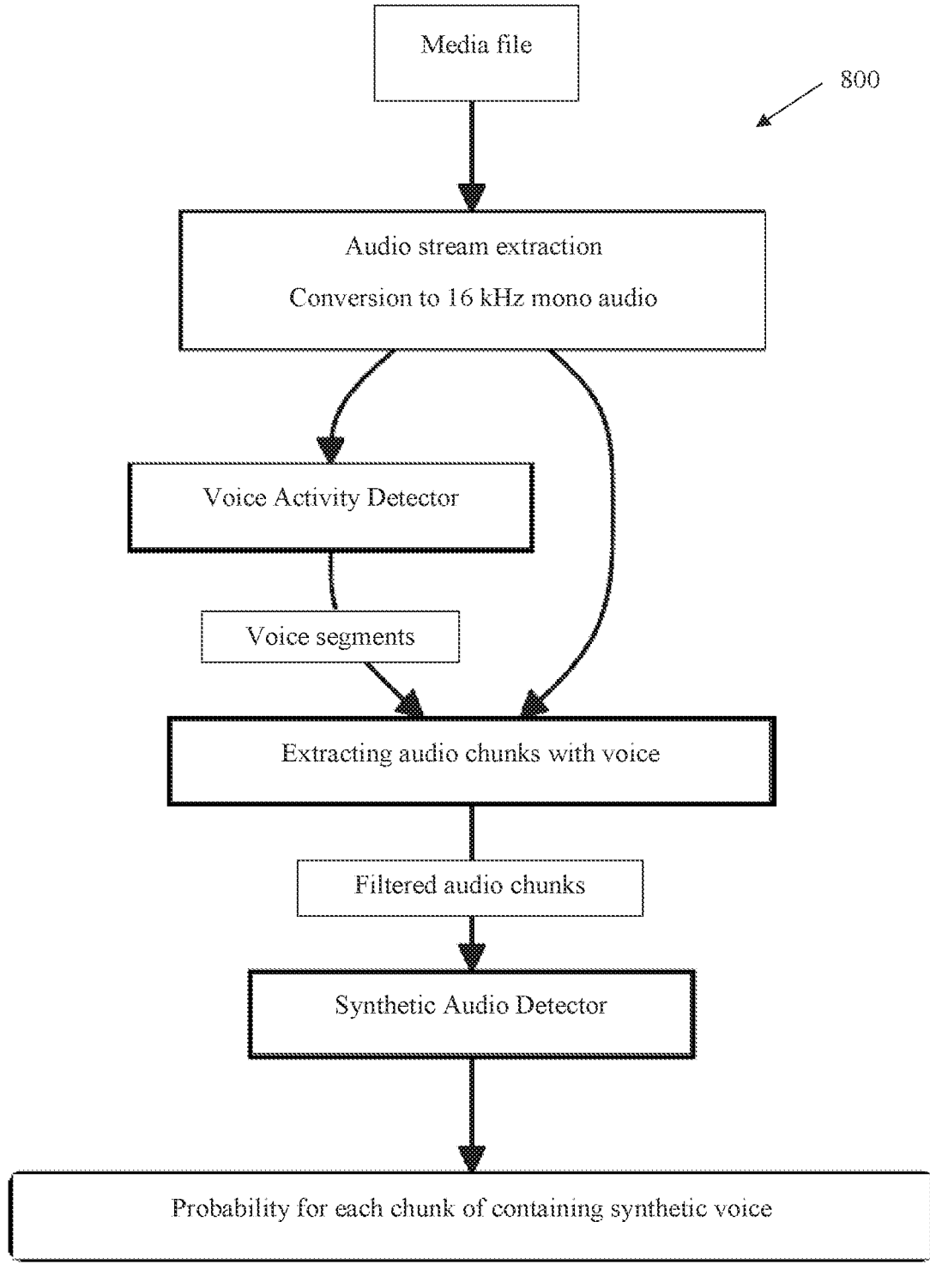
FIG. 8 is an exemplary dataflow diagram depicting a synthetic voice detector, in accordance with some embodiments of the present invention.
Figure 9:
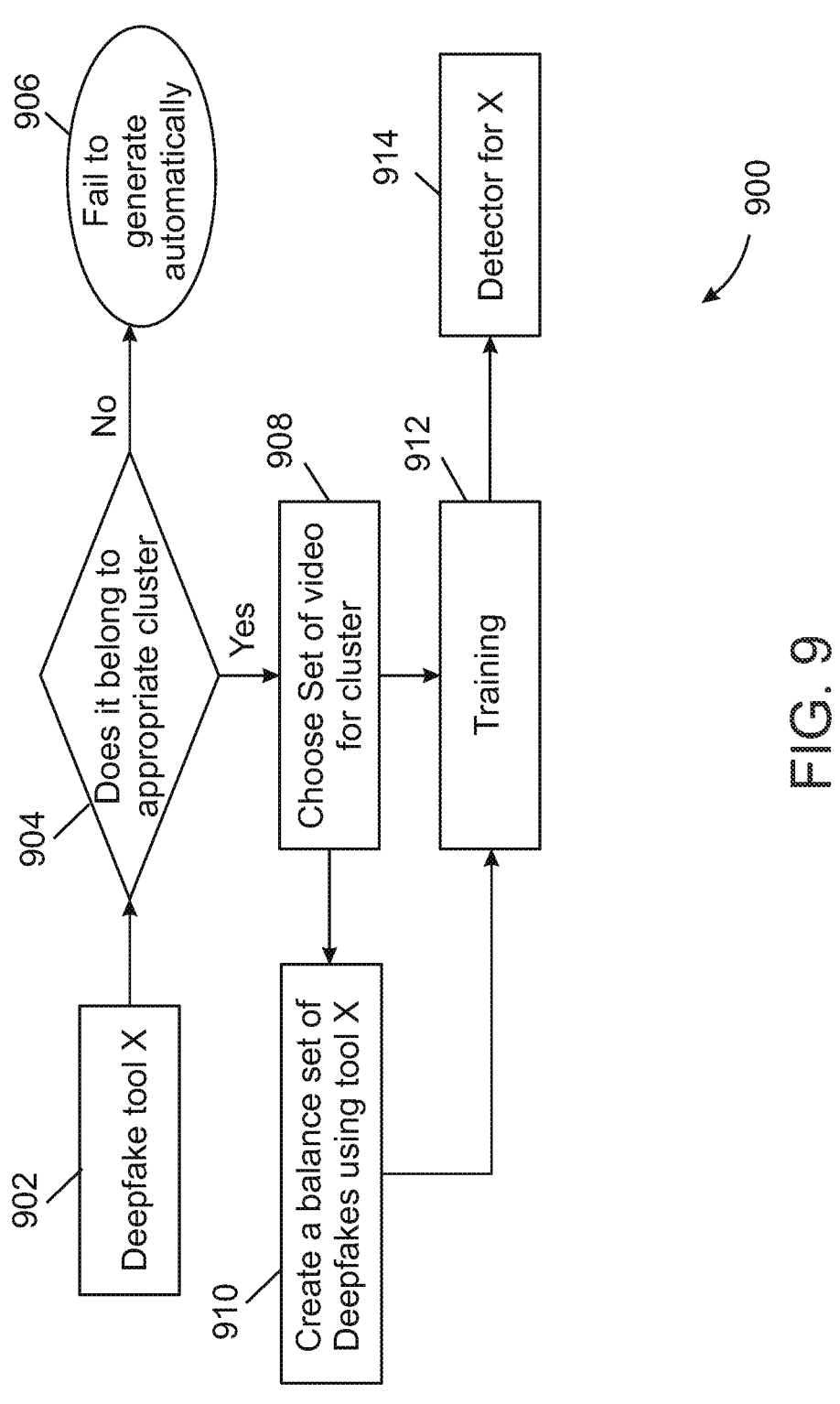
FIG. 9 is a flowchart of another exemplary method of training a detection ML model for determining whether a video was created by a specific deepfake tool, in accordance with some embodiments of the present invention.
Figure 10:
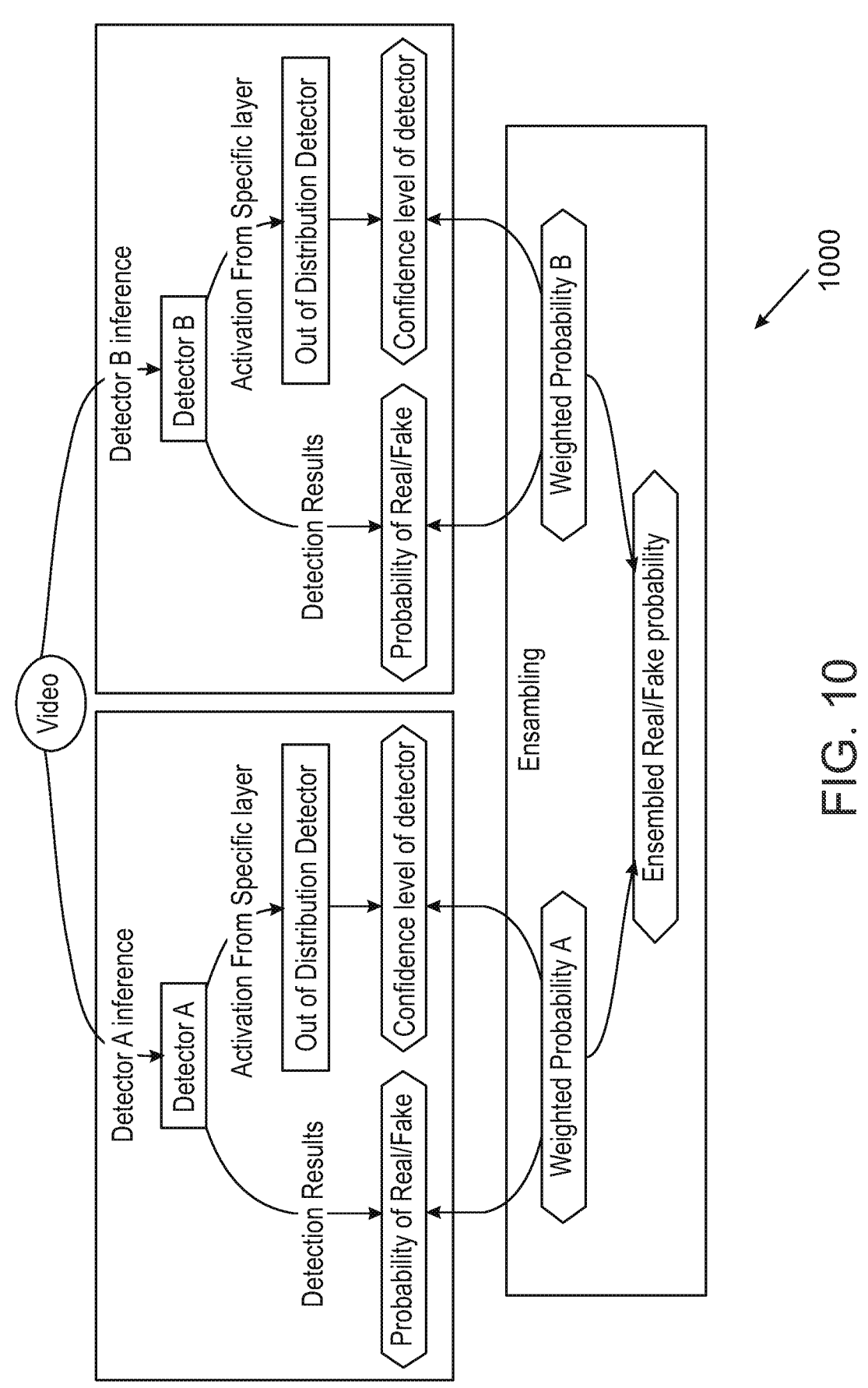
FIG. 10 is a flowchart of another exemplary method of aggregation outcomes of multiple different verification models, in accordance with some embodiments of the present invention.

Reference is now made to FIG. 1, which is a schematic of components of a system 100 for detecting a deepfake video and/or determining use of a specific deepfake tool, in accordance with some embodiments of the present invention. Reference is also made to FIG. 2, which is a flowchart of a method of determining likelihood that a video was created by a deepfake tool according to an aggregation of outcomes of verifications models selected according to annotations of the video, in accordance with some embodiments of the present invention. Reference is also made to FIG. 3A, which is a flowchart of a method of training a detection ML model for determining whether a video was created by a specific deepfake tool, in accordance with some embodiments of the present invention. Reference is also made to FIG. 3B, which is a flowchart of a method of inference by the detection ML model for determining whether a video was created by a specific deepfake tool, in accordance with some embodiments of the present invention. Reference is also made to FIG. 4, which is a flowchart of a method of determining whether a video was created by a deepfake tool by comparing output of a forensic model(s) to ground truth, in accordance with some embodiments of the present invention. Reference is also made to FIG. 5, which is a flowchart of a method of training of and/or inference by a customized detector ML model, in accordance with some embodiments of the present invention. Reference is also made to FIG. 6, which is a flowchart of another method of detecting a deepfake video, in accordance with some embodiments of the present invention. Reference is also made to FIG. 7, which is an exemplary dataflow diagram depicting aggregation outcomes of multiple different verification models, in accordance with some embodiments of the present invention. Reference is also made to FIG. 8, which is an exemplary dataflow diagram depicting a synthetic voice detector, in accordance with some embodiments of the present invention. Reference is also made to FIG. 9, which is a flowchart of another exemplary method of training a detection ML model for determining whether a video was created by a specific deepfake tool, in accordance with some embodiments of the present invention. Reference is also made to FIG. 10, which is a flowchart of another exemplary method of aggregation outcomes of multiple different verification models, in accordance with some embodiments of the present invention.

System 100 may implement the acts of the method described with reference to FIGS. 2-10, by processor(s) 102 of a computing device 104 executing code instructions stored in a memory 106 (also referred to as a program store).

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

Computing device 104 may be implemented as a stand-alone device (e.g., kiosk, client terminal, smartphone) that include locally stored code instructions 106A that implement one or more of the acts described with reference to FIGS. 2-10, for locally analyzing a video 150 for detecting a deepfake video and/or for determining whether the deepfake video was created by a specific deepfake tool. The locally stored code instructions 106A may be obtained from a server, for example, by downloading the code over the network, and/or loading the code from a portable storage device. A video 150 being evaluated for being created by deepfake technology may be obtained, for example, by a user manually entering a path where video 150 is stored, intercepting video 150 being transferred by user(s) across a network, and/or a user activating an application that automatically analyzes videos 150 stored on computing device 104 and/or accessed by computing device 104 (e.g., over a network 110, and/or stored on a data storage device 122). The computing device may locally analyze video 150 using code 106A as described herein. The outcome, such as indication of whether video 150 is a deepfake video and/or whether the deepfake video was created by a specific deepfake tool, may be presented on a display (e.g., user interface 126). Other actions may be taken when the deepfake video is detected, for example, sending a notification to authorities (e.g., server(s) 118), blocking transfer of video 150 over network 110, deleting video 150 from data storage device 122, and/or filtering out the deepfake frames and/or scenes to generate an authentic video.

Computing device 104 executing stored code instructions 106A, may be implemented as one or more servers (e.g., network server, web server, a computing cloud, a virtual server) that provides centralized services (e.g., one or more of the acts described with reference to FIGS. 2-10). Services may be provided, for example, to one or more client terminals 108 over network 110, to one or more server(s) 118 over network 110, and/or by monitoring traffic over network 110. Traffic over network 110 may be monitored, for example, by a sniffing application that sniffs packets, and/or by an intercepting application that intercepts packets. Server(s) 118 may include, for example, social network servers that enable transfer of files including videos between users, and/or data storage servers that store data including videos, which are accessed and/or downloaded by client terminals. Services may be provided to client terminals 108 and/or server(s) 118, for example, as software as a service (SaaS), a software interface (e.g., application programming interface (API), software development kit (SDK)), an application for local download to the client terminal(s) 108 and/or server(s) 118, an add-on to a web browser running on client terminal(s) 108 and/or server(s) 118, and/or providing functions using a remote access session to the client terminals 108 and/or server(s) 118, such as through a web browser executed by client terminal 108 and/or server(s) 118 accessing a web sited hosted by computing device 104. For example, video(s) 150 are provided from each respective client terminal 108 and/or server(s) 118 to computing device 104. In another example, video(s) 150 are obtained from network 110, such as by intercepting and/or sniffing packets to extract videos from packet traffic running over network 110, for example, where the video(s) 150 are being streamed and/or downloaded over network 110. In another example, video(s) 150 are hosted by server(s) for viewing by users accessing the video(s) 150, for example, by streaming and/or for download. Computing device centrally analyzes videos 150 to determine whether the video is a deepfake video and/or to determine whether a specific deepfake tool was used, as described herein. The outcome(s) may be provided, for example, for presentation on a display of each respective client terminal 108 and/or server(s) 118, for notifying authorities, for removal of deepfake videos, and the like, as described herein.

Processor(s) 102 of computing device 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-10 when executed by hardware processor(s) 102.

Computing device 104 may include a data storage device 122 for storing data, such as one or more code based processed described herein, for example, verification models 122A, detection ML model 122B, forensic models 122C, customized detector ML model 122D, and/or training dataset(s) 122E for training different ML model(s) described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Exemplary architectures of the machine learning models described herein include, for example, statistical classifiers and/or other statistical models, neural networks of various architectures (e.g., convolutional, fully connected, deep, encoder-decoder, recurrent, graph, transformer), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised and/or reinforcement learning.

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 and/or client terminal(s) 108 include and/or are in communication with one or more physical user interfaces 126 that include a mechanism for a user to enter data (e.g., manually designate the location of video 150 for analysis) and/or view the displayed results (e.g., indication of whether video 150 is a deepfake video and/or specific deepfake tool used to create video 150), within a GUI. Exemplary user interfaces 126 include, for example, one or more of, a touchscreen, a display, gesture activation devices, a keyboard, a mouse, and voice activated software using speakers and microphone.

Referring now back to FIG. 2, at 202, an input video is accessed. The input video may be provided, for example, in response to a user using a web browser to access the input video on a website, a download of the input video over a network from a server to a client, streaming of the input video across the network from the server to the client, and/or the input video may be locally stored on a data storage device associated with a client terminal (e.g., the user manually clicks on the input video to check whether it is deepfake, and/or the video is automatically checked in response to a user attempting to watch the video).

The input video may automatically be checked to determine whether it is a previously known deepfake video. For example, features of the input video may be searched in a dataset of features of known deepfake videos to find a direct match, or a match similar enough indicating that the input video has been previously identified as deepfake. For example, the video may be analyzed (e.g., as described with reference to 204), and annotated (e.g., as described with reference to 206). A dataset of annotations of known deepfake videos may be searched to find a match with the annotations of the input video, indicating that the input video is a known deepfake video. The annotations, which may indicate content of the input video, may be used rather than a hash and/or other simple signature, since a hash and/or other signature of a slightly modified known deepfake video will not result in a match, while content is retained and can be matched.

At 204, the input video may be analyzed using one or more approaches. The approaches may be based on image processing techniques, machine learning techniques, data analysis techniques, machine vision techniques, analysis of metadata associated with the video, identifying the video codec used and optionally assessing its impact on the quality and integrity of the video, and the like. Examples of analysis approaches include:

*Harvesting data out of the input video. For example, one or more of: identifying people in the video, scene identification, who is talking to who, identifying a location where the video was captured, speech-to-text analysis on what is said in the video. People in the video may be identified, for example, using the approach described with reference to Abderrazzaq Moufidi et al., *"Attention-Based Fusion of Ultrashort Voice Utterances and Depth Videos for Multimodal Person Identification"*, Sensors 2023, 23(13), 5890. Scene understanding to determine which person is talking, and to whom. Scene identification may determine the location where the video was shot. Text-to-speech on what is said in the input video may be useful in understanding information of the input video. For example, if the input video is taken out of a news show on TV, the input video will be introduced with context (e.g., next we will show you a demonstration in Chicago earlier today; George, speaker for the school district in Urbana, will discuss the latest teachers requests).

*Determining a context in which the input video was found. For example, where video is found, a specific user sharing the video, online comments made on the video, and online description of the video. In a more specific example, the video was found on a certain social network (e.g., Facebook) of a specific user (the source of the shares), and some comments were made on the video (e.g., this video shows Obama giving a speech in San Francisco, Obama is talking to the City band executives, this video was taken on Tuesday 24/3/2022). The comments on social media may be harvested for descriptions of the movie. Can look at the description in YouTube, or Facebook.

*Technical information of the input video. For example: file name, video format, resolution, metadata associated with the video, camera sensor used to capture the video, whether the video was captured with a stabilizer, and one or more forensic parameters include one or more of native tongue of speaker in video, age of person in video, illness of person in video, and size of room depicted in video. Technical information may be obtained, for example, using the approaches described with reference to Younes Akbari et al. "*Digital forensic analysis for source video identification: A survey*", *Forensic Science International: Digital Investigation*, Volume 41, June 2022.

At 206, the video may be annotated according to data elements extracted by the analysis. Each data element may be annotated, and/or subsets of data elements may be annotated. The annotations may be, for example, metadata, tags, values of field (e.g., parameters), and the like. Optionally, information associated with the video is identified by analyzing the video. The video may be annotated by adding metadata to the video, where the metadata includes the information identified by the analysis of the video.

Annotations may be created using the data harvested out of the video, for indicting at least one of the following depicted in the video: people, language used, location, objects, topics discussed, activity performed, actual spoken words.

Annotations may be created for the context of the video, including at least one of: which platform video was found on, who put the video on the platform, hashtags associated with the video, entity endorsing the video, comments in response to the video, headline and text about content of the video.

Annotations may be created for the technical parameters of the video.

At 208 evaluation weights may be computed for multiple verification models according to the annotations.

The verification models to apply to the input video may be selected according to the evaluation weights. For example, if there is a verification model that analyzes cats in images, but the input video does not include a cat, the evaluation weight for the cat verification model may be computed to be zero such that the cat evaluation model is not selected at all.

The evaluation weights for the verification models may be computed based on similarity between the input video and the training datasets used to train the different verification models. For example, for the different training datasets of the different verification models, it is known which training videos are authentic and which training videos are deepfake (e.g., by looking at their ground truth label). The performance of each verification model may be computed. Given the training dataset and known labels, approaches such as bagging and/or ensemble classifiers and/or blending may be used to compute the evaluation weight for each verification model for the input video. For example, it could be that for videos of people talking in French (e.g., determined from the annotation), a language verification model may be assigned a higher verification weight for improving the overall evaluation.

At 210, verification models may be selected according to the annotations, optionally according to the evaluation weights computed for the verification models according to the annotations. There may be multiple different verification models to select from, of which a subset thereof is relevant to the input video.

Exemplary Verification Models Include:

One or more forensic models that are not trained to detect that the input video is a deepfake video. The forensic model(s) may generate an indication of a property (e.g., physical property) of a person and/or object depicted in the input video, for example, as described with reference to 408 of FIG. 4. Outcome of the forensic model applied to the input video may be compared to a ground truth obtained by applying the forensic model to one or more authentic videos having a same or similar annotation and/or features as the input video, for example, as described with reference to 410 of FIG. 4. The outcome of the forensic model may be compared to the ground truth obtained from a dataset storing ground truths. The ground truth dataset may be created, for example, as described with reference to 402 of FIG. 4. The ground truth for comparison may be found by searching an index of the dataset of records of ground truth according to the person and/or object to find a matching record that includes the ground truth. Alternatively or additionally, the ground truth is established dynamically and/or in real time, for example, by a real time search of the internet to find the ground truth and/or to find previously made authentic videos to which the forensic model is applied in real time. The outcome of applying the forensic model to authentic videos and/or other authentic data found may be added to the ground truth dataset, for example, as described with reference to 402 of FIG. 4. The outcome of the forensic model may increase or decrease likelihood that the input video is a deepfake video, for example, as described with reference to 412 and 414 of FIG. 4. Individual forensic models do not check whether the video is deepfake. For example, a forensic model that measures height from voice, computes a height of 176 centimeters (cm) from an input voice of a certain person depicted in an input video. When an authentic video of the certain person is analyzed by the forensic model, and is determined that the height of the certain person is 178 cm, the property may be validated, increasing likelihood that the input video is authentic. In contrast, when an analysis of the authentic video of the certain person by the forensic model indicates that the height of the certain person is 250 cm, a discrepancy is detected, increasing likelihood that the voice is deepfake. In another example, another forensic model analysis an input video and determines that a certain person smoked in the past. When an analysis of the authentic video by the forensic model indicates that the certain person smoked in the part, the property may be validated, increasing likelihood that the input video is authentic. In contrast, when an analysis of the authentic video of the certain person by the forensic model indicates that the certain person did not smoke in the past, a discrepancy is detected, increasing likelihood that the voice is deepfake.

One or more deepfake detection models trained to detect that the input video is a deepfake video. Deepfake is the creation of synthetic media or synthetic change to media. Usually, this is done to change the people in the video, what they say, or their activity. Deepfake detection models receives a video and tries to detect if there was synthetic manipulation. Multiple different deepfake detection models may be used for different, for example, different strengths and/or specializations such as for detecting specific manipulations, which may be according to the training dataset used to train the respective deepfake detector model. Deepfake detection models may output a certainty parameter of how likely has the media been syntactically changed, for example, probability. Deepfake detector models could be of video, for example matching lip movement to sound made, of images (or people), and/or of audio. There may be multiple deepfake detectors used, each trying to detect something else but certainly, there are intersections in what they try to detect.

Models(s) for real-world evaluation of intelligence, for example, What is said in the video (which may be false but not necessarily deepfake), what is seen in the video, and what the video is about. From a trust point of view, the model may help determine if something is misleading. Sometimes it will be due to synthetic modification, and sometimes due to lies said in or about the video. In the annotation, many "facts" about the videos are established. This could be things like "Meeting between Obama and Clinton on the 13'th of November in the evening in the Oval Office". This says among other things something about the location of those two people at the specified time. A check of the annotation may be performed, by checking if the people were in the area at the specified time. One or more facts about the video may be checked with any established models/tools for fact-checking, for example, as described with reference to Zhijiang Guo et al., "*A Survey on Automated Fact-Checking*", *Transactions of the Association for Computational Linguistics* (2022) 10:178-206, incorporated herein by reference in its entirety. The model may indicate what part of the video, the fact check found wrong. This may be used to evaluate the trustfulness of the video.

Model(s) for cryptographic data extraction from the video. Videos may be marked with information. The information may be, for example, about the content, used to validate originality, indicating who created the video, point to a database of videos or any other information. The model(s) look in the video for any information in it that could be used to help authenticate the video. Additional details of extracting cryptographic data from the video are described, for example, with reference to Jayakanth Kunhoth et al., "*Video steganography: recent advances and challenges*", *Multimedia Tools and Applications*, 82, 41943-41985 (2023), incorporated herein by reference in its entirety.

Model for detection of which specific deepfake tool was used to create the video, for example, as described with reference to FIG. 3A and/or 3B.

Customized detector ML model(s), created for example as described with reference to FIG. 5, with training described with reference to 516 of FIG. 5.

Referring now back to FIG. 8, an exemplary dataflow diagram 800 depicts an exemplary voice detector, which may be used as one of the deepfake detector models, is depicted.

Referring now back to FIG. 2, at 211, the selected verification models are executed. Outcomes of execution of the selected verification model are obtained.

Optionally, one or more actions are taken in response to the outcomes obtained by execution of the selected verification models, as described with reference to 216.

Alternatively or additionally, at 212, outcomes of the selected verification models may be aggregated. Aggregation may be done by applying the weights computed for each verification model, to the outcome generated by each verification model. The aggregation may be performed according to confidence (e.g., probability) of outcomes generated by the verification models, for example, outcomes having probability values above a threshold are included in the aggregation and outcomes having probability values below the threshold are excluded from the aggregation.

Referring now back to FIG. 7, an exemplary dataflow diagram 700 depicting aggregation of outcomes of multiple different verification models is shown. An input video 702 may be analyzed per frame 704. A face detector 706 may crop a face 708, which may be fed into a feature extractor 710. The extracted features 712 may be fed into deepfake detector models 714, that generate outcomes 716 which are aggregated 718.

Analyzing facial features may enable using the knowledge and/or research conducted in the fields of neurology, psychology, and physiology of facial movement and expression in human communication for identifying synthetic manipulation. Analyzing facial expressions may be used to identify inconsistencies and/or anomalies that may indicate a manipulated video or image, for example, by: (1) examining emotional consistency over time in relation to video context, (2) analyzing the presence or absence of micro-expressions and their temporal patterns in videos and (3) reviewing the temporal changes and coherence of facial muscle dynamics.

Referring now back to FIG. 10, a flowchart 1000 of another method of aggregation of outcomes of multiple different verification models is shown. The described approach provides flexibility in constructing custom solutions by mixing and matching verification models and/or training sets for different purposes, and dynamically adding verification models with ease as the synthetic media evolves producing newer and newer methods. In particular, this approach may circumvents the need to constantly retrain master models with newer data, instead requiring to train only new models. This may alleviate technical challenge of constantly keeping a delicate balance within training data of various training datasets for proper diversity for training a master model and/or ensemble.

Referring now back to FIG. 2, at 214, likelihood (e.g., a probability) that the input video is a deepfake video created by a deepfake tool may be computed according to the aggregation. Alternatively or additionally, likelihood (e.g., a probability) that the input video is authentic may be computed according to the aggregation.

At 216, one or more actions may be triggered in response to the likelihood (e.g., probability that the input video is a deepfake video. For example, the likelihood is presented on a display, viewing of the input video is automatically blocked, the input video is automatically deleted, the input video is added to a dataset of known deepfake videos to enable quick detection of the same or similar deepfake video (e.g., without running through the rest of the features of FIG. 2), and/or a message is automatically sent to another server for example, an administrative server. In another example, a report may be generated. The report may be generated in response to a match and/or mismatch of comparing an outcome of the forensic model(s) to the ground truth, for example, as described with reference to FIG. 4. The report may indicate one or more of: the match or mismatch, a value of the increase in likelihood that the video is deepfake or authentic, and in response to a mismatch providing the at least one indication outcome of the at least one forensic model and the at least one ground truth. For example, when using a forensic model that estimates age in response to an input of spoken speech of a person, the report may indicate: outcome reduced likelihood of authenticity by 25-40%, the ground truth age of the person is 25 years while the output of the forensic model indicates that the age of the person is 60-75 years.

Alternatively or additionally, the action may be triggered in response to outcome obtained by execution of the verification models (e.g., as described with reference to 211) without necessarily depending on the probability (e.g., as described with reference to 212-214). For example, in response to detecting that the deepfake is in the audio portion, and not the video portion, a message to that effect may be generated. In another example, in response to detecting that the deepfake tool used is from a certain country, a different action may be triggered.

Referring now back to FIG. 3A, a method of training a detection machine learning model for identifying a specific deepfake tool of multiple candidate deepfake tools used to create a deepfake video, is described.

At 302, a class of the specific deepfake tool is identified. The class may be defined according to one or more, and/or combinations of adaptations performed by the specific deepfake tool on an input video. Examples of classes include: adapting a face (from a certain specific person to another specific person), adapting what a person says such as to anything possible by lip synchronization, adapting a body of a person, replacing an object, adapting a background, and removing an object.

There may be multiple different deepfake tools, in which case, the class is determined for each deepfake tool.

The class of the specific deepfake tool may be identified, for example, based on metadata and/or a tag associated with the deepfake tool indicating what the deepfake tool is trained to do. In another example, the class of the deepfake tool may be identified by feeding an authentic sample video into the deepfake tool to obtain a sample deepfake video, and comparing the deepfake video to the authentic sample video to detect the change, and determining the class according to the change. The comparison may be done, for example, by subtracting frames of the sample deepfake video from the authentic sample video to identify non-zero values as indicating the change, and/or using other processes that analyze two videos to detect changes between them.

At 304, one or more sample authentic videos corresponding to the class are obtained. In the case of multiple classes, different sample authentic videos are obtained for each class.

A variety of different authentic videos, of the same class, may be obtained, for example, a variety of different scenes, variety of different cameras used to create the authentic videos, and the like. The variety may help avoid bias during training of the detection ML model.

The sample authentic videos corresponding to the class may be automatically identified by a class detector ML model. The class detector model may be trained on a training dataset of training videos labelled with ground truth labels indicating presence of a feature associated with the class.

At 306, the sample authentic video(s) corresponding to the class are fed into the specific deepfake tool that modifies the sample authentic videos based on the class.

At 308, a deepfake video(s) modified based on the class is obtained as an outcome of the specific deepfake tool.

The deepfake videos may be similar to one another. For example, for a deepfake took change changes faces, deepfake videos of similar people are generated from the authentic videos.

At 310, one or more records are created. One (e.g. first) type of record includes the created deepfake video, labelled with a ground truth indicating the specific deepfake tool used to create the deepfake video.

Another (e.g., second) type of record includes the sample authentic video labelled with a ground truth indicating lack of use of the specific deepfake tool.

The same sample authentic video may be used for creating the first type of record, by being fed into the deepfake tool, and for creating the second type of record, by being used in its authentic form.

The type types of records may be included in different ratios, for example, 50/50, 40/60, 60/40, and the like. The two types of records may be used for balancing a training dataset. It is noted that if the training dataset is not balanced between deepfake videos and authentic videos, the detection ML models may be trained to learn the specific change, for example, which specific person depicted in the deepfake videos people were changed to, rather than learning the use of the deepfake tool to perform the change.

At 312, one or more features described with reference to 302-310 are iterated for creating multiple records for being included in a training dataset.

The iterations may be performed to generated different training datasets. For example:

A homogenous dataset of deepfake videos created from a specific deepfake tool. Such uniform dataset is used to train the detection ML model for detecting whether the specific deepfake tool, used to generate the sample deepfake videos of the training dataset, was used to create the video which is being analyzed.

Multiple different homogenous datasets may be created, for each respective deepfake tool. To determine which deepfake tool was used, the same video is fed into each one of the trained detection ML models. The specific detection ML model associated with a specific deepfake tool used to create the deepfake videos for the training dataset, that indicates that the input video is deepfake, indicates which specific deepfake tool was used.

A heterogeneous dataset of deepfake videos created from multiple different deepfake tools of a common class. Such heterogeneous dataset may be used to train the detection ML model for detecting which specific deepfake tool was used to create the video which is being analyzed. Alternatively or additionally, such heterogeneous dataset may be used to detect that a deepfake of the common class was used without specifying which exact deepfake tool, for example, if all of the deepfake tools change faces, a face being changed is detected without determining which deepfake tool was used.

A class heterogeneous dataset of different deepfake videos created from multiple different deepfake tools of different classes. Such class heterogeneous dataset may be used to train the detection ML model for detecting which specific deepfake tool of multiple different candidate deepfake tools was used to create the video which is being analyzed.

It is noted that each of the aforementioned training datasets may include records with one or more authentic videos. Without authentic videos, there is a risk that the trained ML model may see only examples of one class (deepfake) and may erroneously only output an indication of that class.

At 314, one or more detection ML models may be trained on the training dataset(s) for detecting that the specific deepfake tool was used to create an input deepfake video. The different detection ML models generated from the different types of training datasets are described with reference to 312.

Referring now back to FIG. 9, a flowchart 900 another exemplary method of training a detection ML model for detection of a certain deepfake tool is depicted. At 902, the deepfake tool, denoted X, is obtained. At 904, it is determined whether the deepfake tool belongs to a certain cluster, by identifying a class, for example, as described with reference to 302 of FIG. 3A. At 906, when no class is identified, the detection ML model is not automatically created. Alternatively, at 908, a class is identified, a set of authentic videos of the class are obtained, for example, as described with reference to 304 of FIG. 3A. At 910, a set of deepfake videos is created using the deepfake tool, by feeding the authentic videos into the deepfake tool, for example, as described with reference to 306-308 of FIG. 3A. At 912, the deepfake detector model is trained, optionally using a balanced training dataset of authentic videos and deepfake videos obtained by feeding the authentic videos into the deepfake tool, for example, as described with reference to 310-314 of FIG. 3A. At 914, the deepfake detector model for detecting whether the deepfake tool was used is provided.

Referring now back to FIG. 3B, a method of identifying which specific deepfake tool of multiple deepfake tools was used to create a deepfake video, is described.

At 350, an input video is obtained (e.g., accessed).

The input video may have been previously determined to be a deepfake video, for example, using approaches described herein with reference to FIG. 2, FIG. 4, FIG. 5, FIG. 6, FIG. 7, FIG. 10, and/or by other approaches such as another deepfake detector model. In such a case, the specific deepfake tool that was used is being determined.

Alternatively, is it not yet determined whether the input video is a deepfake video or an authentic video.

At 352, the input video is fed into the detector ML model, trained as described with reference to FIG. 3A. Optionally, the input video is fed into multiple different detector ML models, each trained to detect whether a different specific deepfake took was used.

At 354, an indication of a specific deepfake tool used to create the input video may be obtained as an outcome of the detector ML model.

The detector ML model may be specific for the deepfake tool (i.t., trained on records generated by using the specific deepfake tool, as described herein), in which case the detector ML model may indicate whether the specific deepfake tool was used. When the detector ML model indicates that the specific deepfake tool was not used, it may refer to no deepfake tool at all was used (i.e., the input video is authentic) or that the deepfake tool used is unknown.

Alternatively, the detector ML model may indicate which specific deepfake tool out of multiple different candidate deepfake tools was used. For example, when the detector ML model is trained on records created using the multiple different candidate deepfake tools. Detection by the ML model implies that the input video is deepfake. Inability of the detector ML model to indicate the specific deepfake tool may imply that no deepfake tool at all was used (i.e., the input video is authentic) or that the deepfake tool used is unknown.

At 356, features described with reference to 352-354 may be iterated, for example, by feeding the input video into different detector ML models trained on records generated using different deepfake tools, in an attempt to identify which specific deepfake tool was used. The iterations may be performed sequentially until the specific deepfake tool is found, and/or in parallel.

Referring now back to FIG. 4, features of the method described with reference to FIG. 4 use forensic models, which are not trained for detecting use of a deepfake technology. Individual forensic models do not check whether the video is deepfake. The forensic models that may be used may be general forensic model, designed to extract properties of people and/or object, for example, for other applications such as generating legal evidence, and the like. The features of the method descried with FIG. 4 may be used for increasing accuracy of a deepfake detector(s), by increasing or decreasing likelihood that the video is a deepfake video or that the video is authentic, as determined by the deepfake detector.

At 402, a ground truth dataset (e.g., databased) may be created.

The ground truth dataset may be created by searching for authentic videos that include different people and/or objects. Forensic models are applied to each authentic video to obtain a result, optionally a property of the person and/or object.

The forensic model is not trained to detect whether the video is deepfake.

The forensic models may include one or more voice forensic models trained to analyze voice and/or other audio to determined one or more properties of the speaker. The property may be a physical property of the speaker themselves. Examples of properties include height, weight, medical condition, native tongue, and level of tiredness. The property may be location parameters where the speaker is located, for example, if the speaker is located indoors or outdoors, size of room, and/or type of walls.

The forensic models may include one or more models designed to analyze images to extract properties. The property may be a physical property of the speaker themselves. Examples of properties include: height, weight, office size, medical condition, native tongue, and tiredness.

The property outcome of the forensic models are designated as ground truth.

For example, an input video is annotated is being filmed outside (i.e., analysis of scene). A forensic model of the sound detects that the input video is filmed indoor. A contradiction is detected, increasing likelihood that the video is deepfake.

A record may be created for each person and/or object that includes one or more of the ground truths corresponding to the person and/or object. The record may indicate which forensic model was used to obtain which property. The record may be added to an index of the dataset. The index may allow for a fast search of the dataset, optionally according to the person and/or object, to obtain the ground truth.

Other architectures of the dataset may be implemented.

The ground truth dataset may be used, for example, for checking a height of a certain basketball player, and for a certain native language checking where people are from. For example, a height of a certain politician may be obtained by searching the internet. For a medical condition of the politician, a previously recorded authentic video may be analyzed using a forensic model trained to determine medical conditions.

The dataset of a forensic model ground truth (e.g., for example if a person in the input video has a specific chronic disease, or a room of specific size is depicted in the input video) may have an index of different people from different videos, each video of that person may be associated with video properties such as when it was taken, and/or the result of the forensic model.

For some forensic models, the ground truth dataset may include cases in which the forensic models are not predicted to provide correct results and/or the forensic models are inoperable. For example, furniture was rearranged and/or replaced for a certain room in an authentic video, rendering the ground truth related to the room no longer relevant. Such irrelevant results may be ignored.

At 404, an input video is obtained for analysis. The input video may have been previously analyzed by a deepfake detector that determined that the video is likely deepfake, or likely authentic.

At 406, the input video is fed into one or more forensic models. The input video may be fed into the same forensic models used to generate the ground truth dataset.

The forensic model may be based on a systematic and scientific approach to extracting information and evidence from video footage which may be suitable for legal proceedings. Alternatively, the forensic model may extract different data elements from the video, which may be useful as evidence to determine likelihood of deepfake, or increase or decrease likelihood of being deepfake.

At 408, an indication(s) of one or more properties of the person and/or object depicted in the input video is obtained as an outcome of the at least one forensic model. The properties that are obtained as outcomes of the forensic models are the same ones obtained when creating the ground truth dataset, as described with reference to 402, enabling identifying matches or non-matches.

At 410, the indication of the property obtained in 408 is compared to the ground truth in the ground truth dataset (created as described with reference to 402). The ground truth dataset may be searched, for example, via the index of people and/or objects for finding a matching record that includes the ground truth.

Alternatively, the ground truth may be obtained in real time after the input video is obtained, rather than earlier and stored in a dataset (e.g., prior to obtaining the input video). For example, a real time search (e.g., of the internet) is performed for authentic videos of the same or similar person depicted in the input video. The forensic models may be applied in real time to the input video and to the authentic videos that were found.

Since people and/or objects may change over time, there may be a change in the property of the people and/or objects between a time when the input video was captured, and when the authentic video(s) used for ground truth were captured (regardless of whether the search is done in real time, or previously for populating the ground truth dataset). As such, a respective forensic model may be assigned a classification according to predicted changes in its property outcome over time. The property outcome of the forensic model is evaluated according to the classification when being compared to the ground truth. Examples of classification and how the evaluation with ground truth are performed include:

The property is predicted to stay the same, for example, height, certain medical conditions (e.g., Parkinson's), and native tongue. Once the property is determined, it is assumed to remain unchanged. The property obtained from the input video and the ground truth property are compared using the actual values obtained from the forensic model.

The property is predicted to vary within a range, for example, a person's weight may fluctuate up or down over time. In another example, context-dependent properties may vary within the range, for example, characteristics of a person in a same office space are not expected to significantly vary. The property obtained from the input video may be verified as falling within the range of the ground truth representing the expected variation over time.

The property may be predicted to last a predefined amount of time, for example, a person sick with an infection (e.g., corona or other pneumonia causing the person to cough and/or changing their voice) is expected to recover after a reasonable amount of time, or tiredness may substantially vary over time. The property obtained from the input video may be ignored after a predefined amount of time has elapsed, and/or may be entire ignored. For example, the forensic model indicates that the person in the input video is sick with pneumonia. Since the input video was captured over a month ago, it is expected that the person has recovered and is no longer sick. If the ground truth was obtained from an authentic video obtained close in time to the input video, prior to the reasonable amount of time elapsing, the authentic video is expected to also show the person sick with pneumonia.

Different forensic models, optionally different voice models, may be classified from a temporal point of view. Use of the forensic models may be determined according to the classification. The time from creation of the forensic model may impact its use, by knowing how the properties measured by the forensic model changes over time.

At 412, in response to a mismatch between the indication of the property (obtained by applying the forensic model to the input video) and the ground truth, likelihood that the input video is deepfake may be increased, and/or likelihood that the input video is authentic may be decreased.

Alternatively, at 414, in response to a match between the indication of the property (obtained by applying the forensic model to the input video) and the ground truth, likelihood that the input video is deepfake may be decreased, and/or likelihood that the input video is authentic may be increased.

In the case of using multiple different forensic models to obtain multiple different properties, each individual match or mismatch may respectfully increase or decrease likelihood, for obtaining an aggregated change in likelihood. In another example, a voting approach may be used, where if the percent of forensic models obtaining matched results is over a threshold (e.g., over 60%, or 70%, or 80%, or other values), an overall change in likelihood is determined.

Referring now back to FIG. 5, features described with reference to FIG. 5 may create a customized detector ML model designed for analyzing the input video to determine whether the input video is a deepfake video. The customized detector ML model may more accurately determine whether the input video is a deepfake video in comparison, for example, to using a general deepfake detector ML model designed to analyze multiple different videos. The customized detector ML model may be trained to determine whether a specific feature was adapted by using deepfake technology, for example, whether a specific person is adapted. The customized detector ML model may more accurate determine whether the specific person (or other feature) in the input video has been modified using deepfake technology. The approach for training the customized detector ML model is to generate a new training and/or augment an existing training dataset, that is large enough for adequate training of the customized detector ML model (e.g., obtaining a target performance) in response to a single input video.

At 502, the input video is obtained, for example, as described with reference to 202 of FIG. 2. The video is to be analyzed to determine whether it is authentic or deepfake. The video may be analyzed to determine which deepfake tool was used, for augmenting training datasets for training ML models that detect which specific deepfake tools were used.

At 504, the input video may be analyzed to identify one or more features associated with the input video and/or depicted within the input video. It is undetermined whether the features associated with the input video are authentic or fake, since it is undetermined whether the video is authentic or fake. Examples of features include: scenes (e.g., using scene recognition approaches), one or more people depicted in the input video, camera used to capture the input video (e.g., of specific smartphone), language spoken in the input video, and background depicted in the input video.

The features may be detected, for example, using other automated approaches, for example, the forensic models described herein, facial recognition software, auditory analysis software, analyzing of metadata, and the like.

For example, the feature may be a famous personality (e.g., politician, actor, CEO of a company) for which malicious entities are trying to create deepfake video, for example, to use a deepfake tool to make the famous personality say something offensive, and/or to use the deepfake tool for replacing a certain person performing illegal acts with the famous person, to make it seem as if the famous personality said something offensive and/or performed an illegal act. For example, making the famous personality or any other person appear naked.

At 506, multiple authentic videos associated with one or more features associated with the input video are accessed. For example, multiple authentic videos may be accessed for each feature, or for a combination of features.

The authentic video(s) depicting the feature(s) may be found, for example, by searching the wild and/or the internet for videos that include the feature(s) and/or searching a database of authentic videos according to feature(s) (e.g., looking up the feature in an index of the database). For example, an automated query for the famous personality is sent to a search engine to search for videos depicting the famous personality. In another example, videos of a specific person posted on a personal channel and/or on a personal space of a social network of the specific person may be considered to be authentic. In yet another example, in the case of the feature being a specific person, videos of other people that are similar to the specific person (e.g., similar age, similarly built body) may be identified. Videos from reputable sources may be considered authentic.

Alternatively or additionally, one or more authentic videos that do not depict the feature(s) may be found. The authentic videos may depict an alternative feature of the same type as the feature of the input video, but of a different value. For example, when the feature is a specific famous personality, authentic videos that do not depict the specific famous personality but rather depict a different personality, may be found.

The authentic video(s) that exclude the feature(s) and include an alternative to the feature(s) may be found, for example, by searching that internet and/or the database for other feature(s), for example, randomly selected features, which are different than the features of the input video.

At 508, the authentic videos are fed into one or more deepfake tools, optionally according to whether the feature(s) of the input video is associated or not associated with a respective authentic video.

Optionally, in response to the feature of the authentic video also being associated with the input video (e.g., a specific person appearing in the input video also appears in the authentic video), the authentic video is fed into one or more deepfake tools for generating a deepfake video by replacing the feature with a deepfake feature. The deepfake video is not associated with the features, for example, the specific person appearing in the input authentic video is changed to another person in the deepfake video, and therefore does not appear in the deepfake video.

Alternatively or additionally, in response to absence of the feature from an authentic video (e.g., a specific person appearing in the input video does not appear in the authentic video), the authentic video is fed into one or more deepfake tools for generating a deepfake video that includes the feature. For example, a person appearing in the authentic video (which is different than the specific person that appears in the input video) is changed in the deepfake video to the specific person that appears in the input video.

Alternatively or additionally, the same person appears both in the input video and the deepfake video, with another feature being adapted by the deepfake tool, for example, content of the video is changed, what the person saying is changed, and the like.

The change inserted into the deepfake video may depend on the deepfake tool. For example, when the deepfake tool is for detecting face changes, changes from the specific person of the input video, and/or changes to the specific video may be depicted in the generated deepfake video. In another example, when the deepfake took is for changing text, the deepfake video may include changes to and/or from the original text, optionally with the same people depicted in the input video.

At 510, multiple deepfake videos are obtained as outcomes of the deepfake tool(s). The deepfake videos may depict the feature of the authentic video, or may replace the feature of the input video with the deepfake feature.

At 512, one or more records may be created using the deepfake video(s) and/or authentic video(s). The record(s) may include, for example, one or more of:

A deepfake video in which the feature is replaced by a deepfake feature. The record may include a ground truth indicating that the video is deepfake. The ground truth may further include an indication that the feature has been replaced by the deepfake feature. The record (e.g., ground truth) may indicate what the deepfake feature, which corresponds to the feature of the input video, is, for example, a person, an object, what was spoke, and the like.

A deepfake video in which the feature is included therein. It is noted that the feature itself may be authentic or deepfake. The record may indicate whether the feature of the input video is authentic or deepfake. The record may include a ground truth indicating that the video is deepfake. The ground truth may further include an indication that a deepfake feature of a deepfake video has been replaced by the feature of the input video, i.e., the video itself is deepfake, but includes the feature of the input video. The record (e.g., ground truth) may indicate what the feature is, for example, a person, an object, what was spoke, and the like.

One of the authentic video(s) (e.g., obtained as described with reference to 506), labelled with a ground truth indicating that the video is authentic and/or non-deepfake. When the feature is found in an authentic video, the feature may be referred to as an authentic feature. The record (e.g., ground truth) may indicate what authentic feature is depicted in the authentic video, for example, what feature was used to find the authentic video.

At 514, one or more features described with reference to 506-512 for creating multiple records. The multiple records may be included in one or more training datasets.

Optionally, the multiple records are generated for obtaining a balanced training dataset, that includes a first portion of deepfake videos, and a second portion of authentic videos. The balance may be, for example, about 50/50, or 40/60, or 60/40 between the first portion and second portion, or other values.

At 516, the customized detector ML model is trained on the training dataset. Alternatively or additionally, an existing detector ML model is improved by training on the training dataset.

The customized ML model may be trained by applying fine-tuning and/or domain shift on an existing deepfake detection model using the training dataset. For example, the existing deepfake detection model may be trained on a similar dataset, such as for detection of changes of multiple different people in the deepfake video.

Optionally, multiple customized detector ML models are created, for example, for each one of different features depicted in the input video. Alternatively, multiple customized ML models may be created for the same feature by applying multiple domain shifts to one or more existing deepfake detection models. The multiple customized detector ML models may be used as verification models, for example, as described with reference to 210 of FIG. 2.

At 518, the input video is fed into the customized detector ML model, for detecting use of a deepfake tool on the input video.

At 520, an indication of whether the input video is a deepfake video created by a deepfake tool may be obtained as an outcome of the customized detector ML model.

Alternative of additionally, an indication that the input video is authentic is obtained as the outcome of the customized detector ML model.

It is noted that the end result of the training may be higher quality (e.g., more accurate) results on the specific video on which the detector ML model was trained on, higher than videos on which the detector ML model was not trained on. More effort may be spent than just running the detector ML model on those selected videos.

Referring now back to FIG. 6, the method may be based on, and/or may incorporate, one or more features described with reference to FIGS. 3A, 3B, 4 and/or 5.

At 602, an input video is received, for example, as described with reference to 202 of FIG. 2.

At 604, the input video is analyzed to determine if it is an already known deepfake video, for example, as described with reference to 202 of FIG. 2.

At 606, when the input video is determined to be a previously known deepfake video, the method may terminate. Action may be taken, for example, the deepfake video may be removed, flagged as deepfake, and the like.

At 608, alternatively to 604, when the input video is determined to not be a previously known deepfake video, the input video may be analyzed, for example, as described with reference to 204 of FIG. 2.

Exemplary analysis approaches (which are described in more detail with reference to 204 of FIG. 2) include:

At 608A, understanding the input video, by harvesting information from the input video.

At 608B, understanding context of the input video, by harvesting information from the context in which the video was found.

At 608C, obtaining video parameters, such as video technical information.

At 610, the video is annotated, for example, as described with reference to 206 of FIG. 2.

At 612, verification models (i.e., components) and evaluation weights may be selected based on the annotations, for example, as described with reference to 208 of FIG. 2. Evaluation weights may be computed for different verification models.

At 614, ground truth may be established based on the analysis of 608, for example, as described with reference to 402 of FIG. 4. The ground truth may be used for verification in 616. The ground truth may be established by applying forensic models to authentic videos which share similar or same features with the input video, as described herein.

At 616, one or more verification components may be used to verify the input video, for example, as described with reference to 210 of FIG. 2. For example:

At 616A, forensic models may be applied for analyzing the input video, for example, as described with reference to FIG. 4.

At 616B, multiple deepfake detector models may be applied for analyzing the input video. Optionally, a customized deepfake detector ML model is created, for example, as described with reference to FIG. 5.

At 616C, real world evaluation of intelligence extracted from the input video may be performed, for example, by using forensic models of 616A to extract properties of an object(s) and/or people in the video, and comparing the extracted properties to real world data considered as ground truth obtained in 614. For example, the home country of a person in the video is not initially known, but obtained by using a forensic model. The home country extracted with the forensic model is compared to ground truth.

Optionally, other obtained data described herein may be checked, for example, Obama met Clinton on a specific date.

At 616D, cryptographic data extraction from the input video may be performed.

At 616E, use of a specific deepfake tool to generate the input video (which may be determined to be deepfake) may be determined, for example, as described with reference to 202 of FIG. 3B.

At 618, the results of the verification components may be aggregated, for example, as described with reference to 212 of FIG. 2.

At 620, likelihood (e.g., probability) that the input video is deepfake may be determined, for example, as described with reference to 214 of FIG. 2.

At 622, an explanation for the determination that the input video is deepfake or not deepfake may be provided. For example, a breakdown of the different outcomes of the verification components and/or the aggregation may be presented on a display.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models will be developed and the scope of the term machine learning model is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of detecting a deepfake video, comprises:
   feeding a video into at least one forensic model;
   obtaining at least one indication of at least one property of a person or object depicted in the video as an outcome of the at least one forensic model;
   comparing the at least one indication to at least one ground truth obtained by applying the at least one forensic model to at least one authentic video depicting the person or object and/or by searching a ground truth dataset;
   in response to a mismatch between the at least one indication and the at least one ground truth, increasing likelihood that the video is deepfake; and
      in response to a match between the at least one indication and the at least one ground truth, increasing likelihood that the video is authentic,
   wherein the at least one forensic model is not trained to detect whether the video is a deepfake video.

2. The computer implemented method of claim 1, wherein the at least one ground truth for comparison is found by searching an index of the ground truth dataset of records according to the person or object to find a matching record that includes the ground truth.

3. The computer implemented method of claim 2, wherein the at least one ground truth comparison is found by searching to find the matching record without applying the at least one forensic model to the at least one authentic video to obtain the at least one ground truth.

4. The computer implemented method of claim 2, further comprising creating the ground truth dataset by:
   searching for a plurality of authentic videos that include different people and/or objects;
   applying the forensic model to each authentic video to obtain a ground truth for each person and/or object;
   creating a record for each person and/or object that includes the ground truth corresponding to the person and/or object; and
   adding the record to the index according to the person and/or object corresponding to the ground truth of the record.

5. The computer implemented method of claim 1, wherein the at least one forensic model comprises at least one voice forensic model trained to analyze voice to determine at least one property of the speaker.

6. The computer implemented method of claim 5, wherein the at least one property is selected from: height, weight, office size, medical condition, native tongue, and tiredness.

7. The computer implemented method of claim 1, wherein the at least one property of the person or object comprises at least one physical property of the person or object.

8. The computer implemented method of claim 1, wherein a forensic model is assigned a classification according to predicted changes in outcome over time, and the at least one property outcome of the forensic model is evaluated according to the classification.

9. A computer implemented method of detecting a deepfake video, comprises:

feeding a video into at least one forensic model;

obtaining at least one indication of at least one property of a person or object depicted in the video as an outcome of the at least one forensic model;

comparing the at least one indication to at least one ground truth obtained by applying the at least one forensic model to at least one authentic video depicting the person or object and/or by searching a ground truth dataset;

in response to a mismatch between the at least one indication and the at least one ground truth, increasing likelihood that the video is deepfake; and in response to a match between the at least one indication and the at least one ground truth, increasing likelihood that the video is authentic;

wherein a forensic model is assigned a classification according to predicted changes in outcome over time, and the at least one property outcome of the forensic model is evaluated according to the classification;

wherein the classification and evaluation are selected from: (i) predicted to stay the same, and at least one property used as is, (ii) predicted to vary within a range, and verifying whether the at least one property falls within the range of the ground truth, and (iii) predicted to last a predefined amount of time, and not using the at least one property when the predefined amount of time has elapsed.

10. The computer implemented method of claim 1, further comprising generating a report indicating at least one of: the match or mismatch, a value of the increase in likelihood that the video is deepfake or authentic, and in response to a mismatch providing the at least one indication outcome of the at least one forensic model and the at least one ground truth.

11. A system for detecting a deepfake video, comprises:

at least one processor executing a code for:

feeding a video into at least one forensic model;

obtaining at least one indication of at least one property of a person or object depicted in the video as an outcome of the at least one forensic model;

comparing the at least one indication to at least one ground truth obtained by applying the at least one forensic model to at least one authentic video depicting the person or object and/or by searching a ground truth dataset;

in response to a mismatch between the at least one indication and the at least one ground truth, increasing likelihood that the video is deepfake; and in response to a match between the at least one indication and the at least one ground truth, increasing likelihood that the video is authentic, wherein the at least one forensic model is not trained to detect whether the video is a deepfake video.

12. A system for detecting a deepfake video, comprises:

at least one processor executing a code for:

feeding a video into at least one forensic model;

obtaining at least one indication of at least one property of a person or object depicted in the video as an outcome of the at least one forensic model;

comparing the at least one indication to at least one ground truth obtained by applying the at least one forensic model to at least one authentic video depicting the person or object and/or by searching a ground truth dataset;

in response to a mismatch between the at least one indication and the at least one ground truth, increasing likelihood that the video is deepfake; and in response to a match between the at least one indication and the at least one ground truth, increasing likelihood that the video is authentic, wherein the at least one ground truth for comparison is found by searching an index of the ground truth dataset of records according to the person or object to find a matching record that includes the ground truth, without applying the at least one forensic model to the at least one authentic video to obtain the at least one ground truth.

13. The system of claim 12, further comprising code for creating the ground truth dataset by:

searching for a plurality of authentic videos that include different people and/or objects;

applying the forensic model to each authentic video to obtain a ground truth for each person and/or object;

creating a record for each person and/or object that includes the ground truth corresponding to the person and/or object; and adding the record to the index according to the person and/or object corresponding to the ground truth of the record.

14. The system of claim 11, wherein the at least one forensic model comprises at least one voice forensic model trained to analyze voice to determine at least one property of the speaker.

15. The system of claim 11, wherein the at least one property of the person or object comprises at least one physical property of the person or object.

16. The system of claim 11, wherein a forensic model is assigned a classification according to predicted changes in outcome over time, and the at least one property outcome of the forensic model is evaluated according to the classification.

17. The system of claim 11, further comprising code for generating a report indicating at least one of: the match or mismatch, a value of the increase in likelihood that the video is deepfake or authentic, and in response to a mismatch providing the at least one indication outcome of the at least one forensic model and the at least one ground truth.

* * * * *